United States Patent
Link et al.

(10) Patent No.: US 12,001,191 B2
(45) Date of Patent: *Jun. 4, 2024

(54) AUTOMATED 360-DEGREE DENSE POINT OBJECT INSPECTION

(71) Applicant: KODAK ALARIS INC., Rochester, NY (US)

(72) Inventors: Bruce A. Link, Rochester, NY (US); Robert W. Johnson, Rochester, NY (US); Jose Zvietcovich Zegarra, Rochester, NY (US); Peter O. Stubler, Rochester, NY (US); Mark Barton, Rochester, NY (US); Frank R. Brockler, Rochester, NY (US); Michael S. Axman, Rochester, NY (US); Madirakshi Das, Rochester, NY (US); Gabor J. Ferencz, Jr., Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/335,882

(22) Filed: Jun. 1, 2021

(65) Prior Publication Data

US 2021/0286339 A1 Sep. 16, 2021

Related U.S. Application Data

(63) Continuation of application No. 16/401,890, filed on May 2, 2019, now Pat. No. 11,042,146, which is a
(Continued)

(51) Int. Cl.
*G06T 7/70* (2017.01)
*G05B 19/4097* (2006.01)
(Continued)

(52) U.S. Cl.
CPC .......... *G05B 19/4097* (2013.01); *G06T 7/001* (2013.01); *G06T 7/33* (2017.01);
(Continued)

(58) Field of Classification Search
CPC ...... G05B 19/4097; G05B 2219/35134; G06T 7/001; G06T 7/33; G06T 7/70;
(Continued)

(56) References Cited

U.S. PATENT DOCUMENTS

| 4,328,467 A | 5/1982 | van den Brink |
| 10,284,794 B1 | 5/2019 | Francois |

(Continued)

FOREIGN PATENT DOCUMENTS

| CN | 101927391 | 12/2010 |
| CN | 105844057 | 8/2016 |

(Continued)

OTHER PUBLICATIONS

Non-Final Rejection issued in U.S. Appl. No. 16/033,858, dated May 18, 2020.
(Continued)

*Primary Examiner* — Stephen P Coleman
(74) *Attorney, Agent, or Firm* — HOGAN LOVELLS US LLP

(57) ABSTRACT

A system and method for performing real-time quality inspection of objects is disclosed. The system and method include a transport to move objects being inspected, allowing the inspection to be performed in-line. At least one optical acquisition unit is provided that captured optical images of the objects being inspected. The captured optical images are matched to CAD models of objects, and the matched CAD model is extracted. A laser with an illumination light beam has a wavelength in the violet or ultraviolet range then conducts scans of the objects, which are formed
(Continued)

into three-dimensional point clouds. The point clouds are compared to the extracted CAD models for each object, where CTF are compared to user input or CAD model information and the object is determined to be acceptable or defective based on the extent of deviation between the point cloud and the CAD model.

**15 Claims, 27 Drawing Sheets
(13 of 27 Drawing Sheet(s) Filed in Color)**

Related U.S. Application Data continuation-in-part of application No. 16/033,858, filed on Jul. 12, 2018, now Pat. No. 11,049,236.

(60) Provisional application No. 62/587,806, filed on Nov. 17, 2017.

(51) Int. Cl.
    G06T 7/00          (2017.01)
    G06T 7/33          (2017.01)
    G06T 19/20        (2011.01)

(52) U.S. Cl.
    CPC ............... *G06T 7/70* (2017.01); *G06T 19/20* (2013.01); *G05B 2219/35134* (2013.01); *G06T 2207/10028* (2013.01); *G06T 2207/20021* (2013.01); *G06T 2207/20072* (2013.01); *G06T 2207/20221* (2013.01); *G06T 2219/2004* (2013.01); *G06T 2219/2016* (2013.01)

(58) Field of Classification Search
    CPC ........... G06T 19/20; G06T 2207/10028; G06T 2207/20021; G06T 2207/20072; G06T 2207/20221; G06T 2219/2004; G06T 2219/2016; Y02P 90/02
    USPC ........................................................ 382/141
    See application file for complete search history.

(56) References Cited

U.S. PATENT DOCUMENTS

| | | | |
|---|---|---|---|
| 2002/0018216 A1 | 2/2002 | Kawasaki | |
| 2004/0066908 A1 | 4/2004 | Hanke | |
| 2004/0254758 A1 | 12/2004 | Chang | |
| 2005/0148859 A1 | 7/2005 | Miga | |
| 2009/0088999 A1 | 4/2009 | Bryll | |
| 2009/0245616 A1 | 10/2009 | De La Ballina | |
| 2010/0091300 A1 | 4/2010 | Thomaschewski | |
| 2010/0316280 A1 | 12/2010 | Lancaster | |
| 2012/0220851 A1 | 8/2012 | Razansky | |
| 2013/0121564 A1* | 5/2013 | Kitamura | G01C 15/002 382/154 |
| 2015/0002598 A1 | 1/2015 | Furuta | |
| 2015/0054946 A1 | 2/2015 | Zhang | |
| 2015/0221130 A1 | 8/2015 | Georgescu | |
| 2016/0300003 A1 | 10/2016 | Knoll | |
| 2016/0339652 A1 | 11/2016 | Safai | |
| 2017/0084085 A1 | 3/2017 | Solorio | |
| 2017/0193278 A1 | 7/2017 | Mazula | |
| 2017/0280114 A1 | 9/2017 | Samuelson | |
| 2018/0021885 A1 | 1/2018 | O'Connor | |
| 2018/0112426 A1 | 4/2018 | Cooper | |
| 2018/0149471 A1 | 5/2018 | Lu | |
| 2018/0150701 A1 | 5/2018 | Kang | |
| 2018/0374239 A1 | 12/2018 | Wallack | |
| 2019/0188872 A1 | 6/2019 | Aflalo | |

FOREIGN PATENT DOCUMENTS

| | | |
|---|---|---|
| CN | 108303037 | 7/2018 |
| CN | 108458659 | 8/2018 |
| WO | 2012/061945 | 5/2012 |
| WO | 2016/146703 | 9/2016 |

OTHER PUBLICATIONS

Notice of Allowance issued in U.S. Appl. No. 16/033,858, dated Oct. 21, 2020.
Notice of Allowance issued in U.S. Appl. No. 16/033,858, dated Feb. 12, 2021.
Non-Final Rejection issued in U.S. Appl. No. 16/401,890, dated May 14, 2020.
Notice of Allowance issued in U.S. Appl. No. 16/401,890, dated Feb. 9, 2021.
Non-Final Rejection issued in U.S. Appl. No. 16/923,629, dated Aug. 6, 2020.
Final Rejection issued in U.S. Appl. No. 16/923,629, dated Nov. 27, 2020.
Notice of Allowance issued in U.S. Appl. No. 16/923,629, dated Apr. 2, 2021.
Non-Final Rejection issued in U.S. Appl. No. 17/335,755, dated Sep. 19, 2022.
Final Rejection issued in U.S. Appl. No. 17/335,755, dated May 2, 2023.
Non-Final Rejection issued in U.S. Appl. No. 17/335,755, dated Aug. 31, 2023.
International Preliminary Report on Patentability mailed Nov. 2, 2021 in PCT/US2020/030940.
International Preliminary Report on Patentability mailed May 19, 2020 in International Application No. PCT/US2018/057732.
Bosche, "Automated recognition of 3D CAD model objects in laser scans and calculation of as-built dimensions for dimensional compliance control in construction," Advanced Engineering Informatics, 24 (2010), pp. 107-118.
Kim et al., "Estimating Head Pose with an RGBD Sensor: A Comparison of Appearance-Based and Pose-Based Local Subspace Methods," 2013 IEEE International Conference on Image Processing, Sep. 15, 2013 pp. 3637-3641.
Changmin Kim et al.: "Fully Automated Registration of 3D Cad Model with Point Cloud from Construction Site", Proceedings of the 20TH International Symposium On Automation and Robotics in Construction ISARC 2003—The Future Site, Jun. 29, 2011 (Jun. 29, 2011), XP55573701, ISSN: 2413-5844, DOI: 10.22260/ISARC2011/0169 ISBN: 978-90-68-14574-8, the whole document.
Rehder Joern et al.: "Spatio-temporal laser to visual/inertial calibration with applications to hand-held, large scale scanning", 2014 IEEE/RSJ International Conference On Intelligent Robots and Systems, IEEE, Sep. 14, 2014 (Sep. 14, 2014), pp. 459-465, XP032676482, DOI: 10.1109/IROS.2014.6942599 [retrieved on Oct. 31, 2014-10-31] section III Methodology, B. Calibration; p. 460-p. 462; figure 2.
Li Xiaojie et al.: "Auto Calibration of a Laser 3D Color Digitization System", 2009, 12th European Conference On Computer Vision, ECCV 2012; [Lecture Notes in Computer Science], pp. 691-699, XP047541824, ISSN: 0302-9743 ISBN: 978-3-642-04427-4 the whole document.
DeLacalle F J et al.: "Generation of differential topographic images for surface inspection of long products", Journal of Real-Time Image Processing, Springer, DE, vol. 17, No. 4, Jan. 11, 2019 (Jan. 11, 2019), pp. 967-980, XP037187059, ISSN: 1861-8200, DOI: 10.1007/S11554-018-0844-2 [retrieved on Jan. 11, 2019] the whole document.
He Wantao et al.: "A robust and accurate automated registration method for turbine blade precision metrology", The International Journal of Advanced Manufacturing Technology, Springer, London, vol. 97, No. 9, May 29, 2018 (May 29, 2018), pp. 3711-3721, XP036549942, ISSN: 0268-3768, DOI: 10.1007/S00170-018-2173-9 [retrieved on May 29, 2018] the whole document.
Communication pursuant to Article 94(3) EPC issued in EP Patent Application No. 18 801 177.9, dated Sep. 20, 2021.

(56) References Cited

OTHER PUBLICATIONS

Notification of the First Office Action issued in CN Patent Application No. 201880074234.7, dated Dec. 10, 2023.
Communication pursuant to Article 94(3) EPC issued in EP Patent Application No. 20 727 498.6, dated Aug. 1, 2023.

* cited by examiner

Figure 3: Use of a recommendation sub-system in the overall system

Figure 6: Simulation of object being scanned by a two laser-camera system

Figure 7: Calibration target containing fiducial marker holes on steps

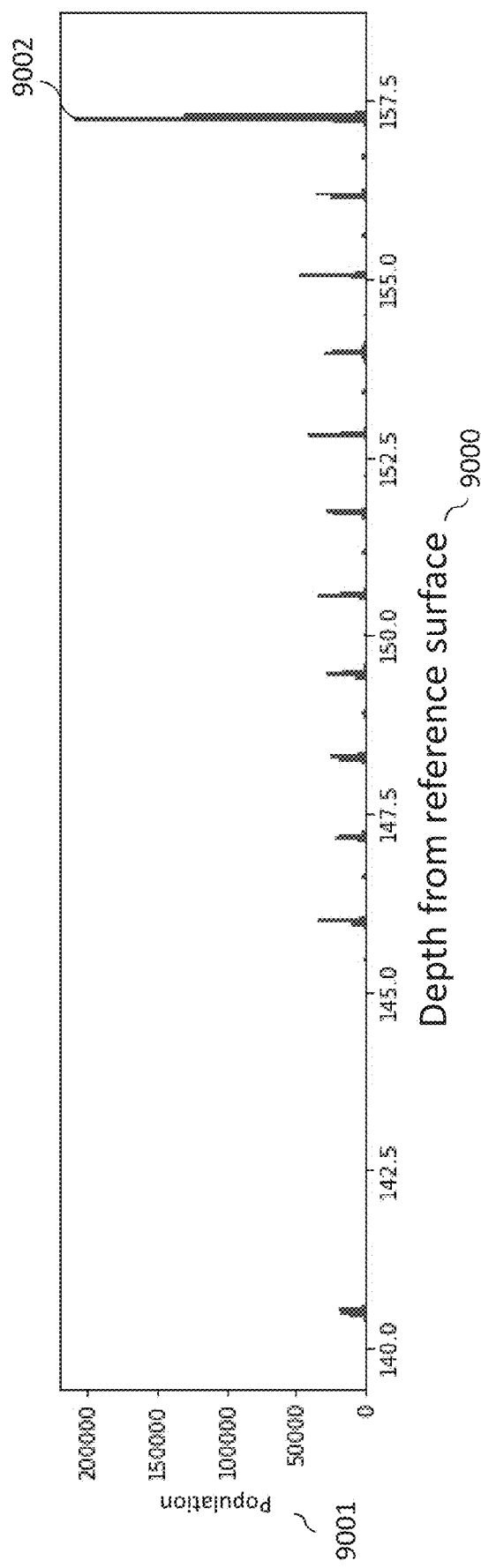
Figure 9: Histogram of distances of points to the defined reference plane.

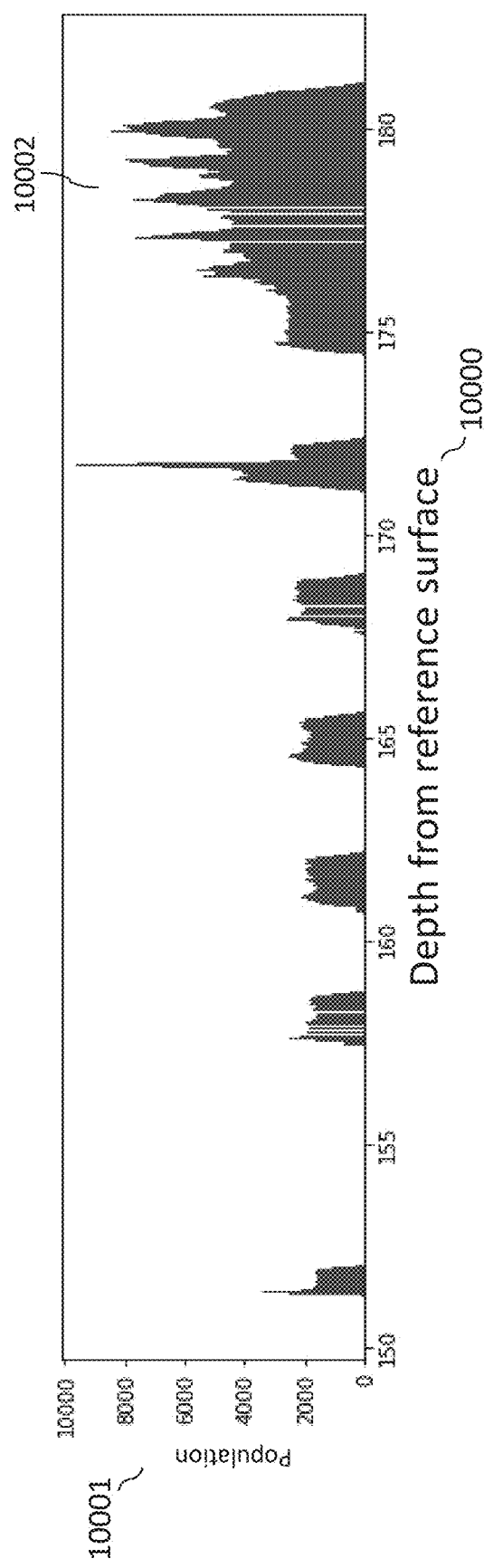
Figure 10: Histogram of distances from points to poorly oriented defined reference plane.

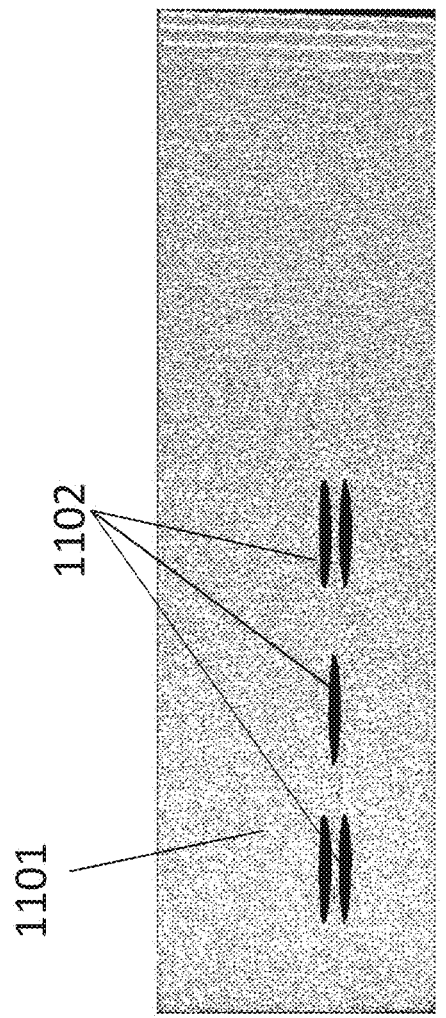
Figure 11: Example image of a plane

AUTOMATED 360-DEGREE DENSE POINT OBJECT INSPECTION

CROSS-REFERENCE TO RELATED APPLICATIONS

This application is a continuation of U.S. patent application Ser. No. 16/401,890, filed May 2, 2019, which is a continuation-in-part of U.S. patent application Ser. No. 16/033,858, filed on Jul. 12, 2018, which claims priority to U.S. Provisional Application No. 62/587,806, filed on Nov. 17, 2017, the contents of which are incorporated herein by reference.

FIELD OF THE INVENTION

This invention relates to automated inspection of physical objects, and in particular to an inspection system and method implementing non-contact, three-dimensional scanning of physical objects.

BACKGROUND OF THE INVENTION

In many manufacturing processes, it is important that all the parts are formed within tolerances defined by industry standards, company standards, or required specifications. For example, in the manufacturing of parts by injection molding, additive manufacturing, or machining, it is important that each manufactured part meet certain standards and specifications. The same is true for parts manufactured using three-dimensional printing, sintered metals, or other component forming processes. In modern production, parts, tools, dies, and molds are usually designed based on computer-assisted design (CAD) models. In computer-aided manufacturing (CAM), for example, computer numerically-controlled (CNC) machine tools use the CAD design as an input to control the operation of the tool in machining a product.

There are several systems and methods known in the art for verifying the surface shape of manufactured parts and products. For example, coordinate measuring machines (CMMs), laser trackers, and three-dimensional scanning measurement systems, and other equipment is used to perform precise inspections. However, these inspection systems require a long and complicated set-up and further require particular positioning of the parts or products to be inspected within the inspection system before inspection can begin. For example, in CMMs, the parts are required to be positioned within a jig to hold the part properly. Thus, a significant amount of time and cost is invested in simply setting up the products or parts and the inspection system, and the set-up process needs to be completed separately for each different part to be inspected. CMMs also capture measurements at specific points, thus producing a sparse sampling of measurements of the object. Thus, to measure the entire object, multiple specific points may need to be measured. Increasing the number of points increases the complexity of measurement, adding to time and cost.

Automated manufacturing techniques such as molding, machining, and assembling used to make components and parts requires that the manufactured parts conform to specifications. Manually inspecting each part is laborious and time consuming and if not done in a timely fashion would result in the manufacture of non-conforming components, requiring rework and waste of time and materials. Automated inspection as part of the manufacturing process can identify non-conforming parts and track trends that indicate and predict that an out of specification condition will happen at some point in the future due to a mold, tool beginning to wear, or a supplier provided non-conformant components. The use of non-contact profilometers to acquire a 3D image of a manufactured component to compare the acquired image to the component specification to verify component conformance. However, relative mechanical movement between the non-contact profilometer, a component, and a supporting surface is required to generate the point cloud defining the 3D image of a component being inspected. Overlapped profile traversals are used to ensure that the part is adequately illuminated from multiple perspectives while the point cloud is being generated and recorded. In addition, overlapped profile traversals allow for the inspection of larger components.

What is needed is an easy-to-use inspection system that can inspect parts and products regardless of orientation and that does not require that the parts or products being inspected are first put into any jig or other mechanism to hold them during inspection. A dense sampling of the object to produce measurements over the entire object at a reasonable time and cost is required to overcome the above-mentioned shortcomings of existing object inspection systems.

SUMMARY OF THE INVENTION

The present invention is directed to an in-line system and method for quality inspection of manufactured parts and products, including first article inspection, critical to function parameters (CTF) and defect detection. The inspection determines if the material or item is in the proper quantity and condition, and if it conforms to the applicable or specified requirements, either of a particular user or an industry standard. The inspection is generally divided into three categories: 1) receiving inspection, 2) in-process inspection, and 3) final inspection. The system and method perform non-contact quality inspection by scanning the three-dimensional (3-D) surface geometry of an object being inspected and comparing information from the scanning process to 3-D models of the object. The objects may be solid, opaque, translucent, or transparent, and may have specular or diffusive surface features. Objects may include a combination of these features, and still be inspected with the system and method of the present invention. Moreover, an object may be inspected at several different stages of its fabrication, such that multiple in-process inspections are performed on each stage. Each stage may require its own inspection process, as described herein.

The system and method may include an optical scanning system and a laser module, including a laser profilometer, for performing precise in-line inspection of objects. In certain implementations, the light beam of the laser profilometer may have a wavelength in the violet or ultraviolet range, although other wavelengths may also be used. When objects, such as parts or products, are being inspected, they may be placed, at predetermined position and in a predetermined orientation, on a transport system, such as a transport belt, that moves them past the optical scanning system and laser profilometer. As the objects move along the transport belt, they pass under the optical scanning system, which scans the objects and identifies the positioning and orientation of the objects on the transport belt. The system and method may inspect multiple objects placed on the transport at the same time, with the transport moving the objects past the inspection system components in an in-line process. The inspected objects could be the same or different part or products, with the optical scanning system recognizing each object as it passes. In addition, the optical scanner system may identify contamination such as dust, oil, or other foreign objects present on the object, and may also detect and measure objects for accuracy of the expected color, texture or finish of the objects. A computer processor in the quality inspection system receives the determined identity of the objects being inspection from the optical scanning system, and loads a data file corresponding to the identified object or product being inspected. Alternatively, the object to be inspected can be predetermined, and a predetermined data file corresponding to that object can be loaded. In either case, the data file may be a CAD model, which is then converted into a uniform point cloud representing the object.

Following the optical scanning system, a laser module including a laser profilometer, for example with an illumination light beam having a wavelength in the violet or ultraviolet range, is provided in the scanning system which is used to scan the objects being inspected. The laser system outputs a regularly spaced three-dimensional (3-D) coordinate point cloud representing the object or objects. The system and method then compares this obtained 3-D coordinate point cloud representing the objects with the uniform point cloud retrieved from the computer processor. Differences between the two are determined, and are used to determine the extent of variations between the object being inspected and the expected product (based on the stored data file). The system and method may then identify parts or sections of the object being inspected as potentially being defective, and may alert a system operator when defective objects are identified.

In particular, the system may be used to inspect parts manufactured from a mold. The mold would have the desired dimensions of the final part, and it is expected that parts produced by the mold would have these desired dimensions within a certain tolerance level. Determining defect data in real time from injected molded parts can be used as a predictive measuring method to determine when significant wear has occurred and the mold needs to be replaced before defects becomes objectionable. Thus, the system may be used as part of a geometric dimensioning and tolerancing quality inspection process. Dimensioning specifications define the nominal, as-modeled or as-intended geometry. Tolerancing specifications define the allowable variation for the form and possibly the size of individual features, and the allowable variation in orientation and location between features.

BRIEF DESCRIPTION OF THE DRAWINGS

This patent application file contains at least one drawing executed in color. Copies of this patent or patent application publication with color drawing(s) will be provided by the Office upon request and payment of the necessary fee.

FIG. 9 illustrates a histogram of distances of points to the defined reference plane.

FIG. 10 illustrates a histogram of distances from points to a poorly oriented defined reference plane.

FIG. 11 illustrates an example of an image of the plane in which the presence of a point is indicated by one value and the absence of a point is indicated by another color.

DETAILED DESCRIPTION OF THE INVENTION

Figure 1A:
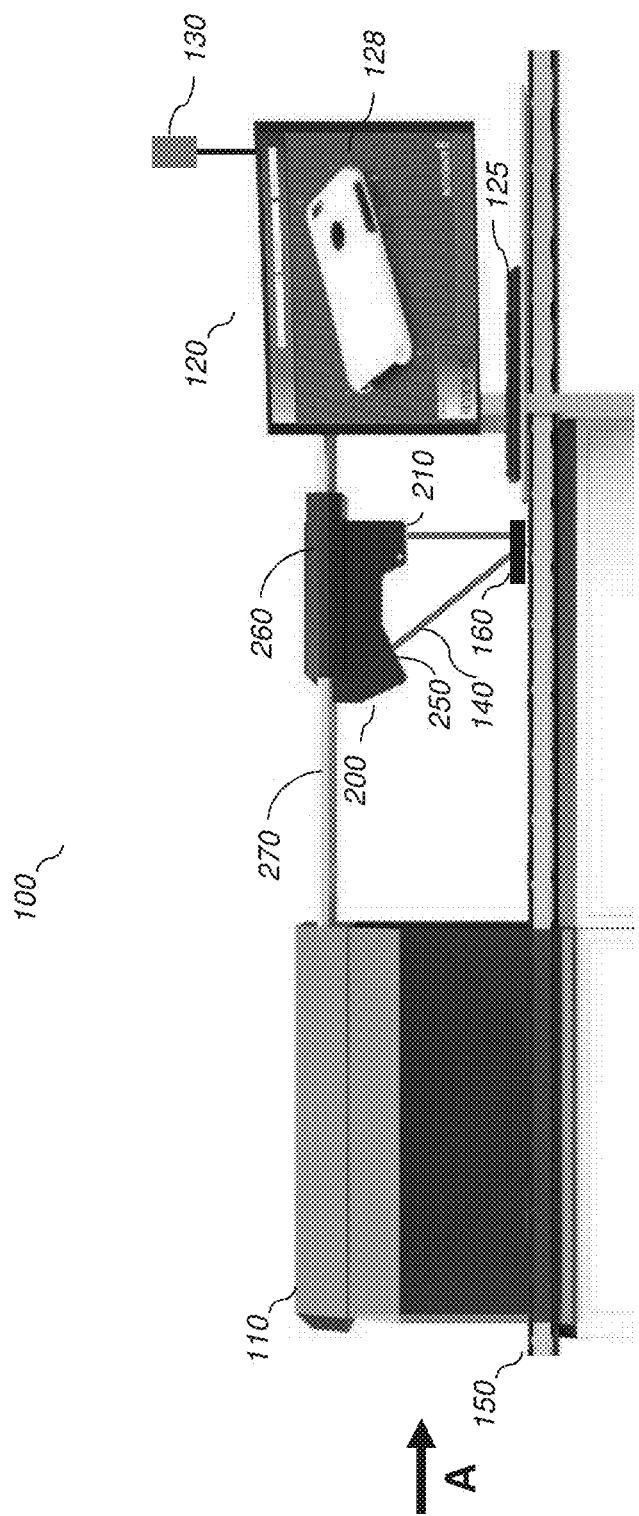
FIG. 1A is a high-level diagram showing the components of the quality inspection system.

The present invention is directed to a system and method for high precision quality control inspection of objects. The system is configured to perform geometric inspection of manufactured parts for quality control and inspection (including first article inspection, critical to function parameters (CTF), and defect detection). As mentioned above, inspection determines if the material or item is in the proper quantity and condition, and if it conforms to the applicable or specified requirements, either of a particular user or an industry standard. The inspection is generally divided into three categories: 1) receiving inspection, 2) in-process inspection, and 3) final inspection. Receiving inspection includes first inspecting an object received to determine if it initially meets applicable requirements and standards. In-process inspection is performed when an object is manufactured in several stages, and an inspection can be performed after all, or certain, of the manufacturing or fabrication stages required to form a final product. Final inspection may be performed on completed objects that are not expected to undergo further fabrication or alterations. The system performs scanning of the three-dimensional (3-D) surface geometry of an object such as manufactured components, parts, and products to detect defects.

The system performs automated, in-line or offline quality inspection by scanning objects on a movable platform, or platen, with both an optical acquisition unit and a scanning system, and making comparisons between the data from the resulting object scans and predetermined data files accessible by a system processor, the data files corresponding to the objects being inspected. The scanning system may include depth measurement devices whose measurements can be used to capture 3-D object geometry during the scanning process. The depth measurement device may be, for example, a laser profilometer system, confocal system, structured light system or interferometer, configured to scan objects on the movable platform.

These different sensors, or a selected subset thereof, may be included in the inspection system. When more than one type of sensor is included, the system may be configured such that an operator or automated program may select which sensors to use, with sensors that will not be used being retracted or repositioned so that they do not interfere with the inspection. Alternatively, a sensor mount may be included, allowing one or more sensors to be interchangeably mounted to the system for use in the inspection process. Such a sensor mount allows an operator to swap out imagers not needed for particular inspection. The system may use different sensors, or combinations of sensors, in imaging different parts, types of objects, particular features of the same object, or different stages of the fabrication of an object. Thus, the system may have new set-up parameters that are implemented for each new sensor or combination of sensors used.

The system can produce an inspection report by comparing the captured dimensions of the actual object with the geometric dimensioning and tolerancing (GD&T) specifications provided for the object. Dimensioning specifications define the nominal, as-modeled or as-intended geometry. Tolerancing specifications define the allowable variation for the form and the size of individual features of the object being inspected, and further define the allowable variation in orientation and location between features and what is expected.

To perform the quality inspection, the system includes a moving transport, an optical system to image objects at the beginning of the transport path, and a one or more depth measurement systems such as a laser profilometer, confocal system, structured light system or interferometer, to record 3-D object geometry located after the optical system on the transport path. The laser profilometer or other depth capture modality may capture 3-D object geometry in the form of an unstructured point cloud representing the object. The system also includes a computer processor for computation and storage of data, including stored object data information such as CAD data that shows the expected dimensions of the objects being inspected. An operator control panel and display may be provided to allow an operator to view CAD images from the storage database, view scanning system captured 3-D images of the objects being inspected, and view heat map and histogram information detailing differences between the CAD images from the stored database as compared to the actual imaged objects. The operator control panel may further allow the operator to modify parameters of the inspection system, control operation of or pause the inspection system, and review defect information regarding the inspected objects.

As shown in FIG. 1A, the quality inspection system 100 includes an optical acquisition unit 110 at one end of a transport 150, which moves objects 160 to be inspected through the inspection system. The transport 150 may be, for example, a conveyer belt or system of rollers, and moves the objects being inspected along the transport path in direction A. The optical acquisition unit 110 may be an area or linear array optical system, including one or more image capturing units. The optical acquisition unit 110 may be connected to a processing device configured to analyze captured images of the objects on the transport 150 in order to identify the object, as well as its position and orientation on the transport. A laser module 200 is included along the transport path, after the optical acquisition unit 110, and is connected to an operator control panel 120. As mentioned, other depth measurement systems, such as confocal systems, structured light systems or interferometers, may be used in addition to, or as an alternative to, the laser module, to record 3-D object geometry. The laser module includes a laser driver 210, and laser sensor 250. The laser may include a mounting assembly 260, connecting it to a traversal mechanism 270, such as a stationary or moveable leadscrew. The traversal mechanism 270 may be configured to allow the laser module to move in three dimensions with respect to the object being inspected. The laser module emits a laser beam 140, which is reflected from the object being inspected 160 and then sensed by the laser sensor 250. The laser module 200 may be, but is not limited to, a laser profilometer with an illumination light beam having a wavelength in the violet or ultraviolet range, used to scan the object and output a three-dimensional (3-D) unstructured point cloud. The laser profilometer may use, but is not limited to, laser triangulation or time of flight displacement sensing to measure depth. The system may also include an operator control panel 120, allowing a system operator to perform inspection of objects, modify inspection parameters, review object inspection results, and respond to defect or alert notifications. The operator control panel may include a user input 125, such as a keyboard, mouse, or touchscreen, and may further include a display 128. An alert notification 130 may be included in the quality inspection system, and may be a visual or audible alert. The user loads the inspection system 100 with the appropriate CAD models and tolerance data for the object or objects to be inspected. Objects that exceed a predetermined tolerance are identified as defective. The user can view the defective three-dimensional (3-D) coordinate point cloud variations from the CAD model through a heat-map displayed on the user display 128 or define actions that should occur for the defective object. The user display may be local to the inspection system, or may be a display communicating with a computing device of the inspection station over a network connection.

Figure 1B:
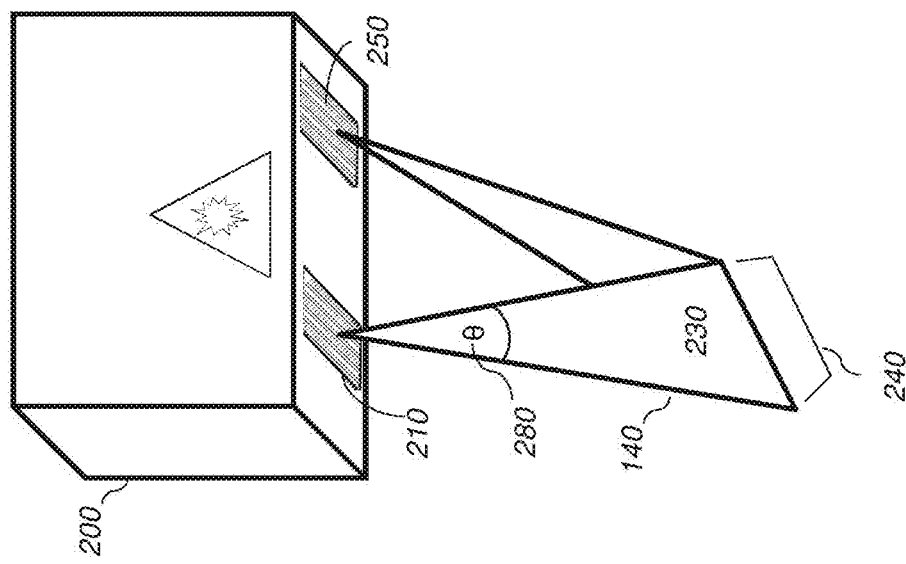
FIG. 1B is an illustration of the components of the laser system in the quality inspection system.

FIG. 1B is an illustration of the components of the laser module 200, which includes a laser driver 210 that outputs a laser beam 140, in the form of a laser cone 230, that projects a line 240, representing the field of view, across the object being scanned. The length of the line 240 formed is related projection angle θ 280 of the laser beam 140 and the distance between the laser driver 210 and the object being inspected. The laser beam 140 is reflected from the object being inspected back to a laser sensor 250 on the laser module 200. In an alternative embodiment, the laser driver 210 could output a laser beam where a laser beam 140 is a point that hits the object and is reflected off the object.

The laser module 200 may be a laser profilometer. In particular, a laser profilometer with Blue-violet laser uses 405-nm wavelength may be used due to its shorter wavelength. A laser module with an illumination light beam with a wavelength in the violet or ultraviolet range is superior to standard sensors that use, for example, red laser diode on metals and organic materials. In addition, compared to a laser module using longer wavelengths in the red region, the shorter wavelength is less susceptible to objects that are self-illuminated due to thermal characteristics. The violet or ultraviolet wavelength minimizes the spread of laser light on the surface of the object 160 being inspected and does not penetrate the object thereby producing more precise measuring results allowing the detection and measurement of a broad range of objects made from plastics, metals, glass, and other material regardless of the features surface finishes.

Figure 2:
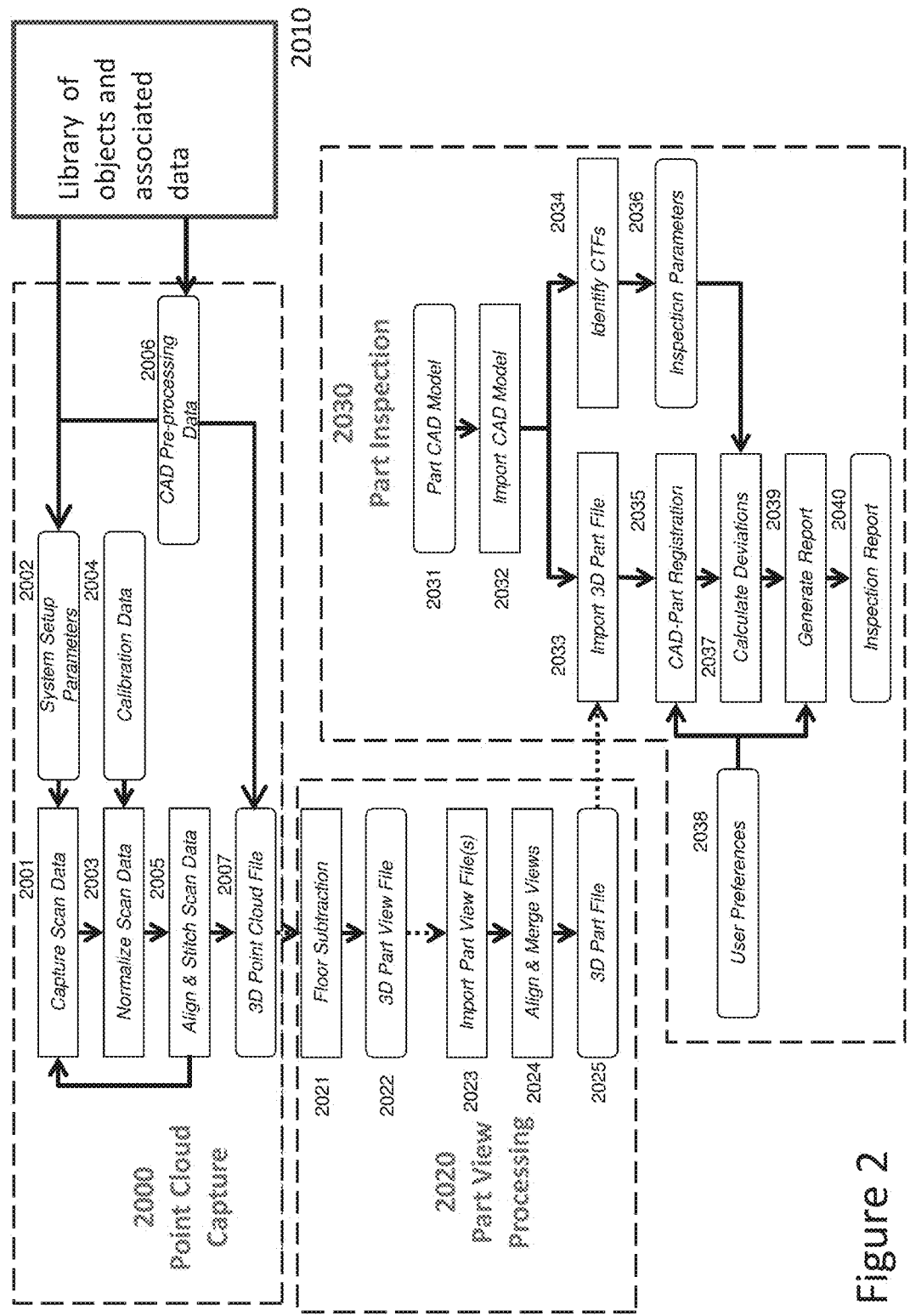
FIG. 2 is an illustration of an overview functional diagram of the inspection system modules.

FIG. 2 provides an overview functional diagram of the inspection system modules, including a Point Cloud Data Capture sub-system 2000, a Part View Processing sub-system 2020, and a Part Inspection sub-system 2030. The Point Cloud Data Capture sub-system 2000 works by acquiring the system set-up parameters 2002 and CAD pre-processing data 2006 from the library of objects and associated data 2010. Once acquired, the system captures the scan data 2001 and then normalizes the scan data 2003. The normalized scan data 2003 includes calibration data 2004. After the scan data is normalized, the data is aligned and stitched 2005. If more scan data is needed, more scan data can be captured 2001. Once the scan data is aligned and stitched, it is generated into a 3D Point Cloud File 2007. All information associated with the expected objects to be inspected is stored in a library of objects database 2010. This information includes the CAD model, GD&T information related to the object, system set-up parameters for scanning the object, and other data computed during pre-processing.

The following operations are carried out on the CAD models as a part of pre-processing, to prepare all the necessary data for point cloud comparisons when the captured point cloud is available. The pre-processing may be carried out by software containing instructions executable by a computer, or may be included as part of an embedded chip or as a cloud-computing resource. To begin the pre-processing operations, a user specifies the CAD file and accepts (or modifies) certain default settings, if necessary. These computations are only done once for each CAD model, and it is not necessary to repeat the procedure for each captured point cloud. The following operations on the CAD models may be performed as part of the pre-processing:

- The CAD model stereolithography (STL) file is loaded.
  - The STL file conveys the object geometry in terms of a list of triangles in 3D. Each triangle specifies 3 vertices, and an outward facing normal vector.
  - Each triangle is interpolated at a high sampling rate, to produce point cloud covering the entire surface of the triangle. All the resultant points are retained to represent the object with a dense cloud of points over the entire surface, not just at the vertices of the face triangles.
- All possible rest positions of the object are computed, which correspond to the possible positions the object might sit in, when resting on a horizontal flat surface. This is done by:
  - Finding a convex hull of the CAD geometry
  - Finding the centroid of the object
  - For each face of the convex hull, testing if the centroid is directly above the face. This is testing if the center of gravity of the object is above the footing of the object, otherwise it would tip over.
  - Keeping as a rest position, the rotation matrix corresponding to each face that passes the above test.
  - As noted above, all information determined about the object, including the convex hull, centroid of the object, and rest position, are associated with the object and stored in the library of objects database 2010.
- Z-axis projection images are computed for each rest position. These images may be visualized as a straight down shadow of the part, sitting in the rest position. The intensity within the "shadow" region represents the height of the part at that location.
- Additional computations of Z-axis projection images for principal component analysis (PCA) for 2D registration as described in more detail in the following descriptions of the invention.
- Read in GD&T data containing specific measurements to be made. The inspection system described also provides GUI tools to an administrator who is performing the pre-processing set up. The administrator sets up the GD&T information during the pre-processing, and the set-up associated with the object is then saved in the library of objects database 2010. As part of the process, the GUI tools allow the administrator to:
  - Manually select datum and measurement planes on the CAD model
  - Set measurement tolerances
    - Position
    - Angle of orientation
    - Roughness
    - Coverage
  - Save all results in the library of objects 2010 for future use The administrator also selects the number and type of imagers needed based on the number of surfaces to be imaged, and specific measurement requirements of the object as determined from the GD&T information. For example, measurements needed inside boreholes may require a confocal imager, measurement of small displacements and surface irregularities may require the use of an interferometer, and correctness of color measurements may need a calibrated vision camera. The inspection system may provide multiple imaging options that can be selected, where the imagers not selected can be swapped out or retracted. The system set-up that includes the imagers selected is stored in the library entry associated with the object in library 2010. If it is not possible to use the multiple imaging options required for obtaining the desired measurements simultaneously (due to system limitations), the inspection process is split into multiple parts with each part specifying the imager(s) to use, and the measurements needed. The library entry for the object then will have multiple steps corresponding to each part of the inspection process.

Setting up the system includes at least setting up the configuration of imagers, sensors, and imaging angles for the inspection system, platen or conveyor speed, and object placement instructions for the particular object that will be inspected. The system is initially calibrated using a specialized calibration target, such as an object with known dimensions and properties. The specialized calibration target may be an ideal version of the type of object desired to be inspected. During operation, the system is set up for the specific object being inspected using system set-up parameters 2002 determined to be appropriate for that object. The set-up parameters 2002 include the positions and orientations of the imagers, such as laser modules, a confocal system, a structured light system or interferometer, or combinations thereof, and the placement of the object on the platen or conveyor. Initial set up can be performed while the system is offline (that is, not in use in inspecting objects), but can also be performed online and refined if the system detects a new part or object. Repositioning of imaging devices may be automatic, depending on the object being inspected, so when a new object is identified by the system, the system performs a new set up procedure and the position of the imaging devices is automatically updated for the new object. Multiple placements of the object may be included to cover all the views needed for measurements. For example, where an object to be inspected has multiple different faces, a particular placement of the object and imagers for each face may be included. In addition, where the entire 3-D geometry of the object can be captured by performing scans with the object in three different rest positions, then the set-up parameters 2002 may include each of these three different positions and orientations of the object, along with the position and orientation for the imagers for each object rest position.

After the system has been set up to inspect the desired object, depth measurement data is recorded by traversing the object with the imager using motion of the imager, the platen or conveyor carrying the object, or both. That is, the object may be left in a stationary position and the imagers may move relative to the object, capturing scans as they move. The data from the scanning elements, or imaging devices, are processed to produce a point cloud for each traversal, and the point clouds for each transversal are then merged in a stitching process to form an overall point cloud that corresponds to the scanning element. Later, data from all scanning elements will be merged and analyzed, to combine the data for a particular object obtained by each scanning element during the process. Alternatively, the object may be advanced along a movable platen conveyor, such that it passes under the imagers. The imagers may then be stationary, or may move relative to the platen or conveyor during the scans. The data from the scanning traversals of the object is aligned using the calibration data derived from scanning the specialized object. Any drift in the calibration over time is tracked, and the system can produce a notification when a re-calibration is required. The calibration process is described in more detail herein. The data from the aligned scanning traversals is merged to produce a point cloud. Multiple point clouds may be generated from different placements of the object to cover all surfaces that need to be measured, as indicated by the system set-up parameters. For example, if the system set-up parameters indicate that three different scans, each having a different object and/or imager position and orientation, are required, then these three scans are conducted and three point clouds are generated.

The function of the Part View Processing sub-system 2020 is to align and merge the point clouds produced during point cloud capture to create a single point cloud covering a 360-degree view of the object being inspected. In order to do this, the system performs floor subtraction 2021 on the obtained point clouds to remove points that correspond to the floor (conveyor, platen, or other platform) that the object rests upon while being inspected. After the floor has been subtracted, a 3D part view file 2022 for the object is retrieved and imported into the system 2023 for comparison to the point cloud data. The point cloud data is aligned and merged 2024, with reference to the 3D part view files, in order to obtain a 3D part file of the scanned object 2025. The Part Inspection sub-system 2030 analyzes the obtained 3D part files to determine if the object being inspected has defects. To do this, the 3D part files, each representing a single point cloud for individual objects inspected, obtained from the Part View Processing sub-system 2020 are imported 2033 into the part inspection module 2030, where they are compared with CAD models 2031 for the particular objects being inspected. The comparison process involves CAD-Part Registration 2035, that can be adjusted per a user's preferences 2038. Deviations between the obtained 3D part files and the expected data based on the CAD models 2037 are used to generate an inspection report 2039, indicating to an operator whether the object being inspected falls within acceptable limits, or whether it is determined to be defective 2040. The report generated 2039 is customizable with user preferences 2038.

The Part Inspection sub-system 2030 starts with receiving a part CAD model 2031 that is then imported 2032 into the Part Inspection sub-system 2030. If a 3D part file is not imported 2033, the sub-system will identify CTFs 2034 and then provide the inspection parameters 2036. Then, deviations will be calculated 2037 between the part CAD model and CTFs, which will generate a report 2039, indicating to an operator whether the object being inspected falls within acceptable limits, or whether it is determined to be defective 2040. The report generated 2039 is customizable with user preferences 2038.

Scan Set-Up Parameter Recommendation System

Prior to inspecting particular objects, the system may first be set up using a parameter-recommendation system to ensure that the objects are placed in the appropriate positions and orientations, and that the system is set to properly capture the necessary data for the particular objects. An inspection set-up typically has many parameters that need to be set before a scan can be performed. Many of these parameters may depend on the particular object being scanned. For example, the size of the object determines the distance each traversal of the scan needs to cover, and the number of traversals needed. The configuration and type of imagers needed based on the number of surfaces to be imaged, and specific measurement requirements. In a repositionable imaging system, the angles and positions of the imagers are influenced by the areas that need to be scanned based on the geometric dimensioning and tolerance (GD&T) measurements needed. A scan set-up parameter recommendation module, part of Point Cloud Capture 2000 shown in FIG. 2, guides set up for the particular objects being scanned. The scan set-up parameter recommendation module includes software that models the imaging set-up of the system to compute the capture set-up parameters needed for adequate coverage of the object being inspected. To do this, CAD models and the GD&T measurements needed for the particular object being inspected are provided to a system processor that executes a software simulation of the inspection system that computes appropriate parameters to be used for the particular object. The computed parameters are stored in a library of object inspection information stored in computer memory.

As mentioned above, some inspection applications involve in-process inspections, where the object being manufactured is tested at intermediate points during its manufacturing process. These objects may have multiple CAD models that represent the expected state of the object at the intermediate points. The system set-up requirements are determined separately for each of these intermediate CAD models, and a separate entry is maintained in the library for each.

Figure 3:
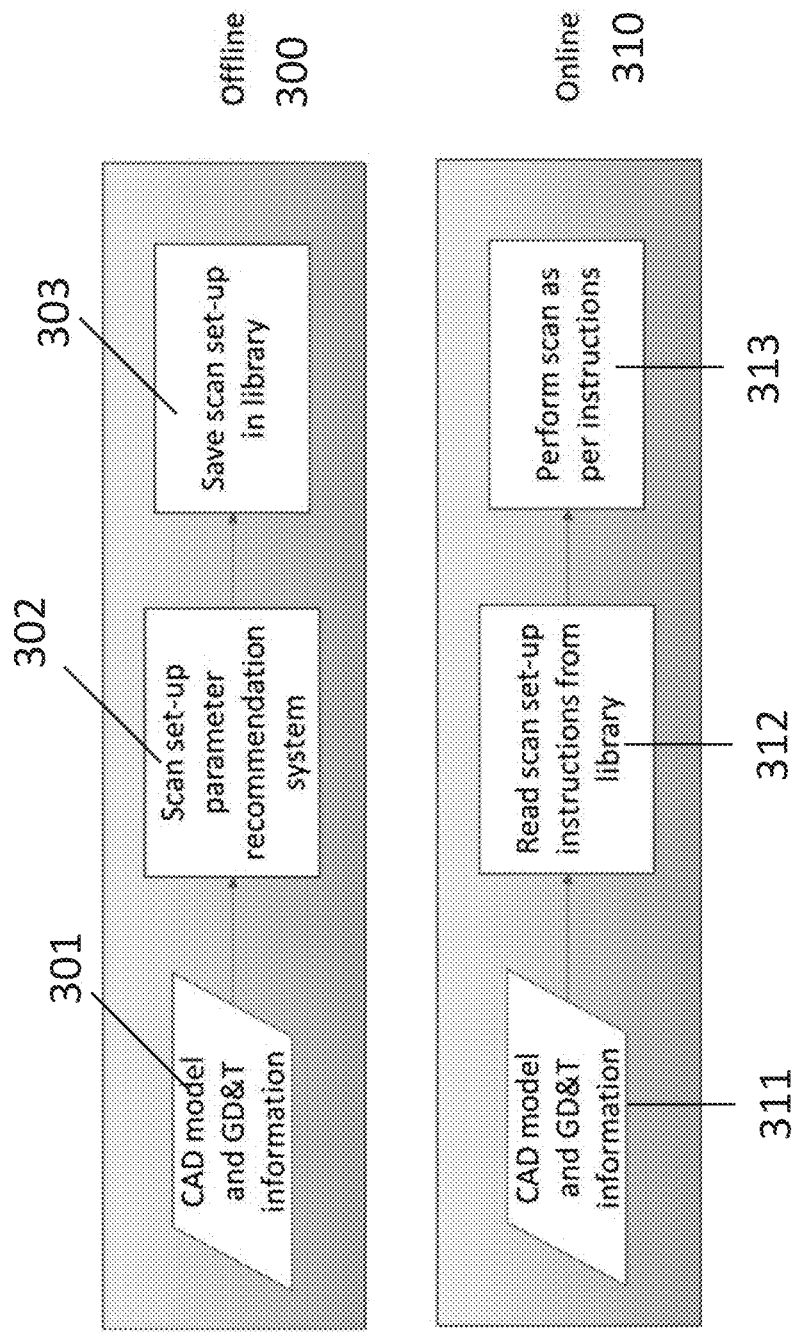
FIG. 3 is an illustration of the parameter-set up recommendation system.

FIG. 3 shows the use of the scan set-up parameter recommendation system, which is implemented as a software module that includes a modeling simulator. As shown in FIG. 3, during an off-line procedure 300, CAD model and GD&T information for a particular object is retrieved 301 by the module. This information is used in the execution of a scan set-up parameter recommendation system software simulation process 302, which results in a determination of the set-up parameters for the system for that particular object. The simulation software includes a complete specification of the system, including the number, type, and positioning of the sensors and capture devices, their characteristics such as region in focus, adjustments supported in angle and height, motion characteristics of the sensors and capture devices, and the transport, platen or conveyor speed and direction parameters. The determined set-up parameters are saved in a system library 303, in an entry that relates the set-up to the object. The simulation process is executed for each of the objects expected to be scanned by the system, and the computed set-up parameters are stored in the library. This process is completed offline before the inspection system is ready for scans and before scans are being performed by the system. The system may be considered to be offline when pre-processing steps are being carried out, such as parameter computations to store in a library. Scans may be performed only after the offline stage is complete, the system set up, and deployed for use.

For a given object or inspection process, the system can have multiple different stored set up parameters. In use, the system may select from the stored set-up parameters depending on the requirements or preferences of the user, and may be based on, for example, the type of object being inspected, the type of inspection being performed. The operator may select which set-up parameters to use, or the system may automatically determine which set-up parameters to use based on identification of an object to be inspected by the optical acquisition system.

After the scan set-up parameters have been stored, the inspection system is ready for inspection of objects that correspond to entries in the scan set-up library. If new types of objects are to be inspected, an administrator with access to the recommendation system software can complete a new simulation so that set-up parameters of the new object are stored in the library. When the system is in use, or online, process 310 shown in FIG. 3 is followed. First, CAD model and GD&T information for a particular object is retrieved 311. Then, the system reads the scan-sup instructions 312 for that object from the library before each scan and the system is set up accordingly. After the system is set-up according to the retrieved parameters and instructions, the system perform scans according to these set up parameters and instructions 313. This ensures that the resulting scan will have the data necessary for the inspection of the object.

The part may be set-up in accordance to the system set-up parameters using an automated system such as a robotic arm, or may be done manually by an operator following provided guidelines. The guidelines may be provided by displaying graphics and figures in the GUI, as well as by projecting visual guide markers on the platen or conveyor. When projections are used, they may be formed by using the laser module or other light source of the depth measurement system that is then used to obtain depth measurement captures during scanning inspections of the object. Projections can take the form of a scaled outline of the part and textual and/or graphical instructions and indicators to guide the operator in proper part placement and orientation. When the optical acquisition unit is included in the inspection system, this optical acquisition unit can capture images of the object to be inspected. The captured images of the object can then be analyzed by the system to determine if the object has been placed in the correct position and orientation for inspection before it is moved past the scanner in the inspection process. For example, the camera may capture images of the object and the illuminated outline areas of where it is expected to be. These images may be analyzed, and if the object is positioned within the illuminated areas, the system may determine that the object is ready for inspection.

If analysis of the images captured by the camera system before the scanning inspection begins show that the object is not in the proper position and orientation, the scanning process may be interrupted and an alert issued for the object to be repositioned. This procedure may repeat until it is determined that the object is in the proper position and orientation. Moreover, if the captured images from the camera indicate an object having a different finish or texture than what was expected has been placed in the system for inspection, the system may again issue an alert and allow for new inspection set-up parameters to be loaded before inspection begins.

Figure 4:
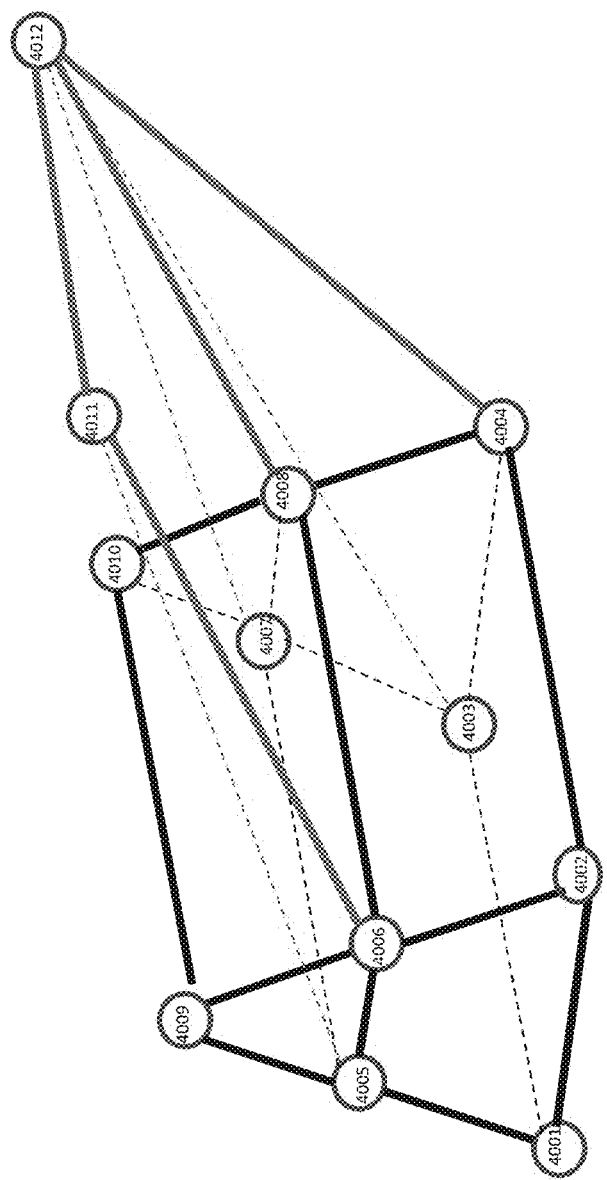
FIG. 4 is an illustration of a laser (4009-4010) and sensor (4011-4012) showing ray casts and volume in focus (4001-4008)

The scan set-up parameter recommendation system includes a simulator that computes the resulting point cloud that would be obtained for a given configuration of the laser and optical receiver, object and the motion of the laser imaging module as well as the platen or conveyor carrying the object. The computation uses ray casting to determine the points on the object surface that would be visible to the imaging module at any given position. Ray-casting is a process where the expected path of a ray from its origin source to a reception source is projected, implemented as a computer graphics algorithm that determines the intersection between a ray and a surface. For example, in a laser system, the ray casting projects the path of laser light from the laser to a receiver. Visible points are points where a ray from the source is incident on the point on the surface of the object, and the reflected ray from the point is received at the receiver without being blocked (typically by a part of the object itself). If an obstructing surface is in the path, the ray casting will show that the emitted light would not be received at the receiver. The visible points are computed over the entire traversal routes to generate a point cloud that would be detected. For example, a typical laser profilometer set-up shown in FIG. 4, where 4009-4010 indicates the laser, and 4011-4012 indicates the optical receiver that detects the reflected laser light. The laser cone covers the area 4001-4002-4003-4004 on the platen, but only the volume included in 4001-4002-4003-4004-4005-4006-4007-4008 is in focus and structures in this volume are included in the visible points. Points closer than the 4005-4006-4007-4008 plane, or beyond the 4001-4002-4003-4004 plane are not imaged, and thus would not be considered to be visible points. The laser 4011-4012 and optical receiver 4011-4012 are in fixed positions relative to each other, but the whole laser-camera assembly can move, traversing the platen. The depth can also be adjusted so that plane 4001-4002-4003-4004 is on the platen surface. By performing this ray casting and computation of visible points, the simulator can then determine the se-up parameters.

Figure 5:
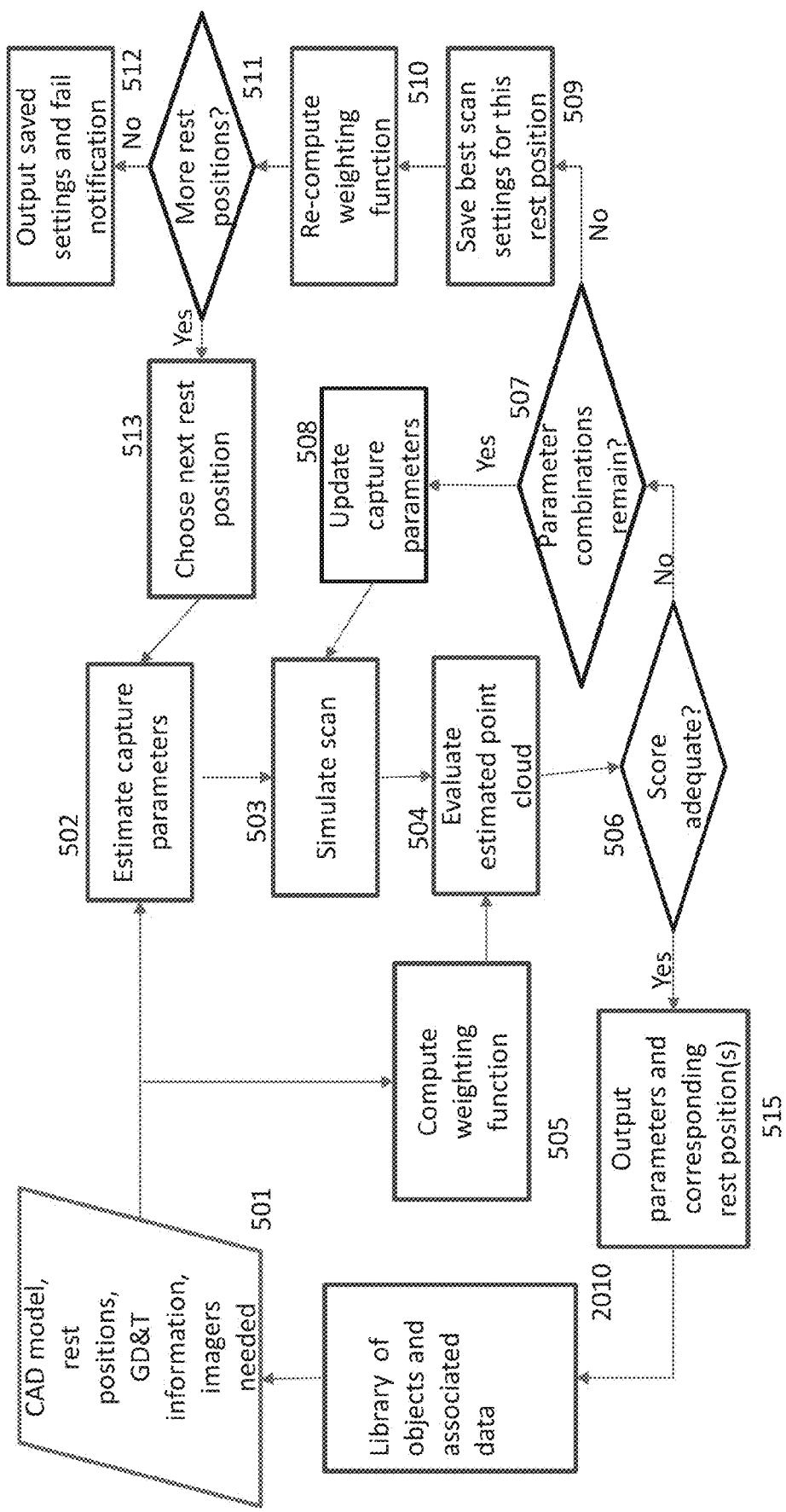
FIG. 5 illustrates a block diagram of the ray casting technique used to find the capture set-up parameters that produce an adequate scan of the object.

Using this ray casting technique, the simulator is used to find the capture set-up parameters that would produce an adequate scan of the object as shown in FIG. 5. As shown in FIG. 5, input data 501 including the CAD model, rest positions, GD&T information, and imagers needed for the desired object for the simulation is loaded into the program from the library of objects 2010. If the object has multi-part inspection process, each such part is simulated separately. The system simulates the selected imager(s) as an emitter and a receiver which can be modeled as a point or as lines based on the type of imager.

The program estimates initial capture parameters 502 from the size and extent of the CAD model. A range and step-size for each capture parameter is also determined based on the system set-up. For example, the right laser can be set at a range of −25 to +25 degree angle about the Y-axis, with a step size of 5 degree. A simulated scan of object 503 is computed by the simulator program using ray casting. At specified intervals during the simulated traversal of the laser, the intersection of the laser line with the object is computed by ray-casting. If there are no intersections, the object is not in the laser's path at that position. If there are intersections, the first intersection with the object is on the surface the laser is incident on. A ray is constructed from the laser-object intersection to the receiver, and the number of intersections with the object is computed for this new line. If there are zero intersections, it means that the camera can see the intersection, and this point is added to the detected point cloud. If there are one or more intersections, then it means that though the laser is incident on the object surface, the camera is unable to see the surface because it is obstructed by other parts of the object (i.e. this is in the shadow cast by the object structure itself). These computations are repeated after moving the laser-camera set-up by one step interval. Smaller intervals produce a denser estimated point cloud, but will also be slower because of the computational cost of computing more intersections.

The simulator evaluates the estimated point cloud, and computes a score 504 using a weighting function 505 for the surfaces of the CAD model indicating the importance of that section of the object. In one embodiment, weighting function 505 is computed from the GD&T information as follows. The CTF areas of the object, which are areas that are of particular relevance as to whether an inspected object would be acceptable or not, are obtained from the GD&T information of the object. A cell-level weighting function is defined as a set of weights between 0 and 1 for each CAD model cell. For example, a cell containing a feature that is critical to function may be weighted 1.0, whereas an area of the object that has a large tolerance for error may be weighted 0.1. The areas of the object that need not be measured can be weighted 0.0. A default weight of 0.5 can be assigned if no specific CTF areas are available for the cell. Cells in the original CAD model may also be resampled to a finer resolution (creating more cells) when finer control of the weighting function is desired in cells containing CTF areas. The sampling resolution of the surface mesh (which is the area covered by each cell) may also be adjusted to be finer (using more cells) based on the tolerances specified in the GD&T information.

The estimated point cloud is scored based on the density of points, the weighting function, and any other factors considered to be important for processing steps downstream, such as the overlap of coverage between the left and right imagers. The density of points around each point can be computed as the number of points within an area of a given radius from the point. While being most accurate, this method of determining the density of points can be computationally slow, given that there are typically hundreds of thousands of points in the point cloud. While having less accuracy, a quicker determination of approximate density may be obtained by computing the number of points within each cell of the CAD model, divided by the area of the cell. A CAD model is often described in a format where the 3D object surface is modeled as a collection of cells, and the cells are typically triangular. This approximate density can be computed with very little additional computation if the identity of the cell where the intersection of the laser beam and the object surface occurs is maintained during the computation of intersections using ray-casting.

The point density computed for each cell of the CAD model is multiplied by the weight for the cell from the weighting function to obtain a cell-level score. The normalized (scaled between 0 and 1) weighted sum of the point densities over all cells is used as the point cloud score for comparing between point clouds. A determination is then made to determine if the score is adequate 506. The score is considered to be adequate if it exceeds a pre-defined threshold. For finer discrimination, each cell score may be required to meet a cell-level threshold; or a single threshold can be specified for the overall point cloud for coarser scoring. Additional factors may also be used to determine if a score is adequate. For example, if downstream processing steps such as registration of views requires overlapping areas between two views, an overlap score can be computed from the number of points in each triangular cell of the CAD model of the object from view A and view B. The overlap score for the cell is then computed as (1−difference in count between the two views/the greater of the two counts), and an overall overlap score computed as the normalized weighted sum of the cell-level overlaps. A threshold can be set for the minimum overlap needed, and point clouds with overlap scores not meeting the threshold are considered to have an inadequate score.

If the simulated parameters result in a score that passes an adequate score check 506, the system parameters and corresponding rest positions that achieved that score in the simulation are output 515 for storage in the library 2010 as the recommended system set-up parameters for that particular object. They can then be accessed by the scanning system prior to inspection of physical samples of the modeled object, to ensure that the captured scans can be used to adequately inspect the object.

When a score is not adequate, a determination of whether parameter combinations remain to be tested 507. When additional parameter combinations remain 507, the capture parameters are updated 508 and the next available parameter combination is selected. Parameter combinations are generated by incrementing capture parameters to step through their range by a step (equal to their step-size). Capture parameters include the start and end of the imager scan path, start and end position of platen or conveyor, the height and angle(s) of the imaging system, the rest position of the object and number of traversals. Parameters may be incremented one at a time, or some may be grouped to increment/decrement simultaneously. For example, if the angle of the imager(s) is incremented along the direction of the object motion, the start position of the object can be moved in coordination. A new simulation is launched 503 with the updated capture parameters 508. The process is repeated with the new parameter combination till an adequate score is obtained.

If no scan with adequate score is obtained using the available parameter combinations, and the determination 507 indicates that no parameter combinations remain for testing, the parameter settings for the best scoring scan are saved 509 along with the rest position used. The cell-level weighting function is re-computed 510 so that the cells where the threshold is already met in the previously stored best scan are reassigned to 0.0, and cells where the threshold was not met are reassigned to 1.0. A different rest position is selected for simulation, and the process is repeated using the new cell-level weighting function. Determinations are made as to whether additional rest positions remain to be considered 511. At each rest position available, as determined in 511, the additional cell weights that meet the threshold are reassigned to 0.0 before selecting the next rest position 513 until an adequate score is achieved. The overall scan parameter recommendation includes the capture parameters for each rest position that was used in achieving the final adequate score.

It is likely that multiple captures at different rest positions 513 may be required to achieve an adequate simulated scan. If the score is not adequate after all rest positions have been exhausted, indicated by determination 511 that there are no more rest positions to be considered, the saved best scoring scans are output 512, along with a notification to the administrator that the simulations failed to find a recommended set of parameters. The administrator then has the option to change the number and type of imagers to address the problem.

Figure 6:
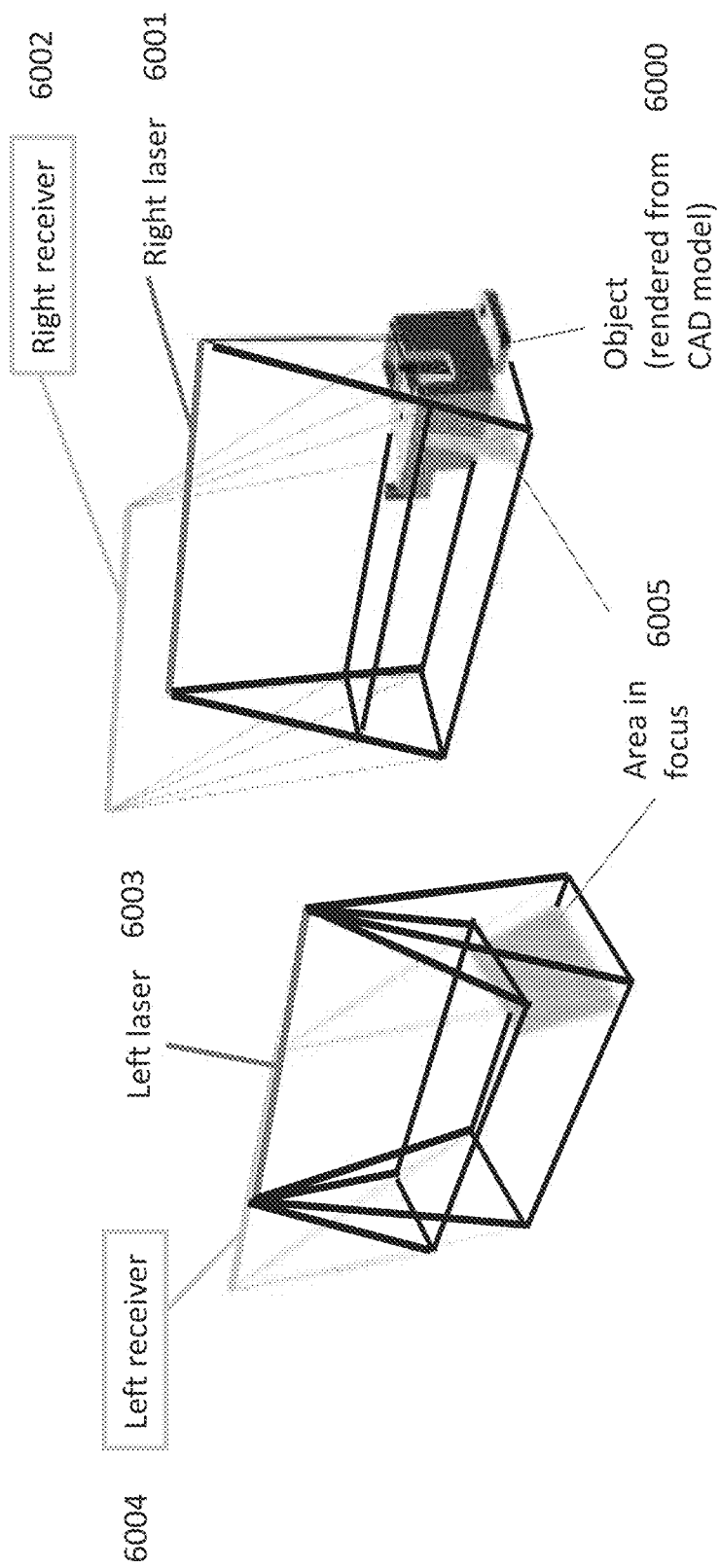
FIG. 6 is a simulation of an object being scanned by a two laser-camera system.

For example, FIG. 6 shows a two-laser profilometer system modeled by the simulator. In this case, the laser emitter is modeled as a line shown in dark blue and the receiver is also modeled as a line shown in light blue. As shown, the set-up simulation includes a right laser 6001, a right receiver 6002, a left laser 6003, and a left receiver 6004. The object 6000 for simulated inspection is rendered from a CAD model. As shown in the FIG. 6, the light emitted from the lasers 6001 and 6003 would be reflected back to the receivers 6002, 6004. Areas of focus 6005 can be imaged by the system, whereas areas falling outside the areas of focus would not be imaged. In a simulated scan, simulated traversals of the object with the two laser profilometers are modeled, with each traversal comprising of multiple steps. The intersection of the laser with the object is computed at each step of the traversal, and it is determined if the receivers 6002, 6004 can obtain a measurement for each point on the surfaces of the object the laser is incident on. If the number of intersections with the object of the ray-cast from a receiver to the laser intersection points is zero, then the point is visible. That is, the path of the emitted light from the laser to receiver is not blocked by another part of the object, and the reflected angle of the light is such that it would be received at the receiver. These points are added to the estimated point cloud.

During the online inspection process, the operator retrieves the system configuration and the set-up parameters from the library. An optical acquisition unit, such as a vision camera system, can be used to identify the object on the transport or platen, inspect the set-up of the imagers as well as the positioning and orientation of the object, to verify that the set-up matches the recommended set-up for that object. A notification can be sent to the operator in case of detected mismatch.

When an adequate scan set-up recommendation is not possible, or further fine-tuning is required, an administrator can use the system's visualization tools to achieve the desired result. The simulator can produce a density map visualization of the computed point cloud that indicates the point densities on the object surface. A visualization of the point cloud showing the points visible to each imager, and the overlaps between any two imagers can also be presented to the user. Another visualization can show points visible in one rest position, a second rest position, and the overlap between the two point clouds. The point cloud(s) may be displayed as an overlay over the CAD model to visualize the coverage of the surface area of the object. These visualizations can be run with different parameters, and a side-by-side or overlapping view comparing the point cloud from one set of parameter settings with another set can be used for fine-tuning the capture set-up parameters.

System Calibration Prior to, During, or after Object Inspection

In the object inspection system as described above, one or more laser profilometers may be mounted on a mechanical stage, such as a rack and pinion assembly, so that the profilometer can sweep across the object being inspected. The object is positioned upon a supporting surface, which can be a stationary platform, a mechanical stage with control of up to six degrees of movement, or a conveyor belt. As an alternative, the one or more profilometers can be mounted to a robotic arm which can inspect an array or matrix of objects that can be made up of a plurality of manufactured parts or components. However, mechanical assemblies used to move the object support surface or the one or more laser profilometers such as with a rack and pinion mechanical assembly drift over time due to wear, repeatedly reaching the end of travel, and or changing directions. These types of mechanical hysteresis are compensated for by recalibration of the system. Rotational components of the transformation are less sensitive to the mechanical hysteresis of the system than the translational components. Translational components can be averaged but not rotational components.

Figure 7:
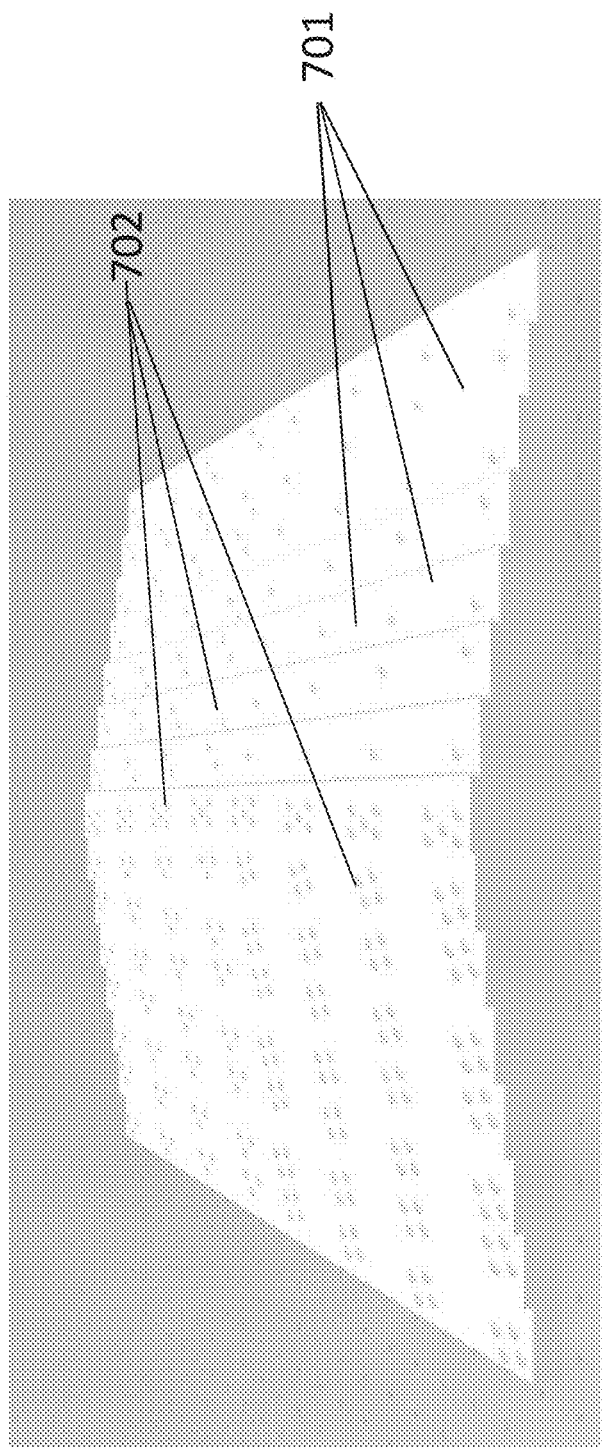
FIG. 7 depicts a calibration target containing fiducial marker holes on steps.
Figure 8:
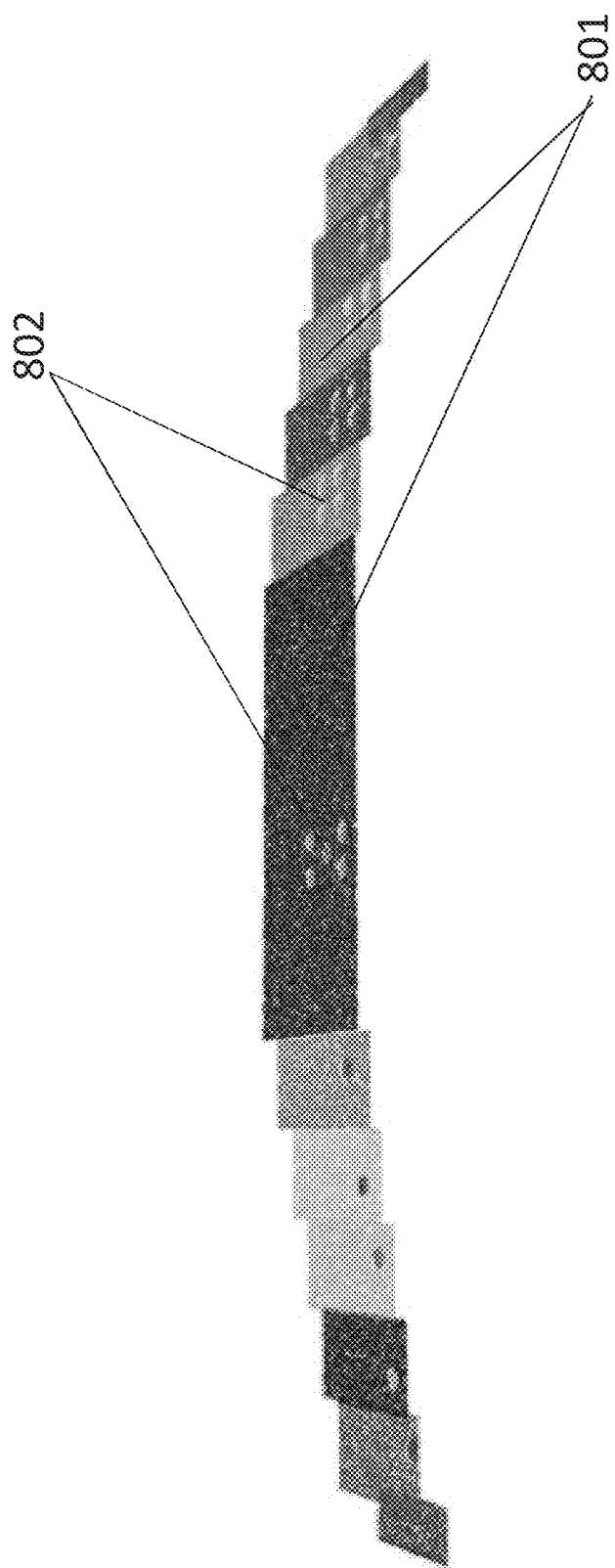
FIG. 8 illustrates an example scan already segmented into planar segments.

Calibration of the scanning system is dependent upon detecting and accurately locating fiducial elements on a calibration target. The calibration target may include a plurality of surfaces at different depth levels from the laser profilometers, with the plurality of surface including fiducial elements in predetermined locations. For example, as shown in FIG. 7, the calibration target may include a plurality of step-like surfaces 701, with the surfaces including fiducial elements in the form of marker holes 702 at predetermined locations. Other types of fiducial markings, such as raised surfaces, lines, grooves, or gaps may be used. The fiducial element marker holes 702 may be singular holes, or may be groups of holes arranged in different patterns. After the calibration target is scanned by the inspection system, a point cloud representing the calibration target is generated, as shown in FIG. 8. In the obtained point cloud, the fiducial element holes 802 and surfaces 801 of the calibration target are identifiable, and their location can be determined. Detecting and locating the fiducial element holes is implemented as a calibration process. First, the obtained point cloud of the calibration target, shown in FIG. 8, is segmented into separate planes, with each plane representing the one of the surfaces of different depths, and the bottoms of the holes in that surface. For example, in the calibration target shown in FIG. 7, each step surface and the bottom of the holes in that step surface would form a plane. Then, the calibration process examines the planes to detect and locate the fiduciary element holes. After the fiducial holes have been located in the point cloud, the determined positions of the holes in the point can be compared to the known dimensions of the calibration target, and the inspection system may be calibrated so that the measurements in the obtained point cloud match the known dimensions of the calibration target. The calibration process determines an affine transformation matrix (size 4×4) that is used to remove rotations and shear caused by scanning with the laser module at non-orthogonal angles to the direction of motion of the platen or conveyor carrying the object.

The holes, or other fiduciary elements, in the calibration target are distributed in a pattern, with clusters of holes located at different known positions on the calibration target, that makes the holes identifiable based on the number of holes in the cluster and alignment with other clusters. The number of holes in the pattern also makes it unlikely that all the hole centers would align with their expected locations unless the transformation matrix was sufficiently accurate. For example, the calibration target shown in FIG. 7 includes a plurality of surfaces 701, and a plurality of spaced out clusters of holes 701 arranged in patterns. The calibration process uses a random sample consensus (RANSAC) algorithm to find a transformation matrix that produces the best fit between the hole locations in the obtained point cloud and the known hole center locations of the calibration target. After the calibration target is scanned and the point cloud obtained, the calibration process is implemented on the obtained point cloud and generally includes:

1. choose a random group of 4 hole centers in the point cloud and:
   a. compute the transformation matrix needed to align the 4 locations with their expected locations;
   b. apply the transformation matrix to all other points and count the number of points that fall within a specified threshold of their expected locations (inlier points);
2. repeat step 1 for N iterations (for example, N=1000); and
3. determine a final transformation matrix as the one with the best fit, as indicated by the most number of inlier points.

The calibration process requires two parts. In a first part, the calibration target must be scanned to obtained a point cloud, and the point cloud must be separated into the planes representing each surface of the object. In the second part, the fiduciary elements in each surface must be detected, and their locations determined so that the transformation matrix can then be found. There are two alternative methods to implement the first part of the fiduciary element detection and location process.

In a first method, the obtained point cloud of the calibration target is separated into planes for each different depth surface in a process using the following steps:

Method 1, Part 1
1. Scan calibration target to obtain a point cloud representing the target.
2. Tesselate the point cloud into multiple tiles, which are typically non-overlapping.
3. For each tile, attempt to fit a plane model to the points. The plane model parameters include four values: a three-dimensional unit vector normal to the surface of the plane, and the distance of the plane from the origin of the coordinate system.
4. Add the normal vectors from each tile where a plane could successfully be fit into a collection.
5. Calculate the average of the collection of normal vectors.
6. For each member of the collection of normal vectors, compare to the average and remove from the collection any vectors that are outliers (or insufficiently similar to the average). The comparison of the averages is performed as the dot product of the average normal vector and the normal vector under consideration.
7. If the membership of the collection changed, return to step 5.
8. Using the resulting average normal vector for orientation, define a reference plane outside of the point cloud.
9. Calculate the distance of each point of the cloud to the defined reference plane.
10. Create a histogram of distances from the points of the cloud to the defined reference plane. Since the defined reference plane should be parallel to the surfaces, such as the steps of the calibration target, the histogram is expected to show spikes at the distances from the reference plane to each step. FIG. 9 illustrates an example of such a histogram, with spikes 9002 included at the distances from the reference plane 9000 of each step of the calibration target as represented in the point cloud. The population 9001 represents the number of points at the given depth.
11. Analyze the histogram to find the local maxima. Each of these maxima correspond to the distance of one of the steps to the defined reference plane.
12. For each local maximum in the histogram, create a group of points each with a distance to the defined reference plane that falls within a tolerance threshold to the local maximum. Each of these groups is a planar segment of the original cloud corresponding to a detected plane (step surface or the bottom of the holes).

This first method of determining the planar segments may also include the following, to provide a refinement of the planar segments:

13. For each planar segment, fit a plane model; specifically, calculate the normal of the segmented points.
14. Calculate the average of the normal values weighted by the population of points in each planar segment. (Since the target should have parallel planes they should all be the same).
15. Applying the average normal vector to each of the planar segments, recalculate the distance from the coordinate origin for each plane.

In a second method, the obtained point cloud of the calibration target is separated into planes for each different depth surface in a process using the following steps:

Method 2, Part 1
1. Scan calibration target to obtain a point cloud.
2. Using prior knowledge of the rough orientation of the calibration target, define a reference plane outside (below) the point cloud.
3. Measure the distance of each point to the defined reference plane.
4. Create a histogram of distances from the points to the defined reference plane. If the reference plane is indeed parallel to the planes representing the surfaces of the object in the point cloud, the histogram would show clear spikes 9002 at certain depths, as shown in the histogram in FIG. 9. However, if the reference plane chosen is not parallel to the planes, FIG. 10 illustrates that the histogram would be less spikey 10002 at the distances from the reference plane 10000. The population 10001 represents the number of points at the given depth.
5. Measure the entropy of the histogram. The spikier the histogram, the lower its entropy, the smoother the histogram, the higher its entropy.
6. Follow a gradient descent approach to refine the orientation of the defined reference plane.
   a. Perturb the orientation of the defined reference plane
   b. Create a histogram of distances of each point to the perturbed defined reference plane.

c. Calculate the entropy of the resultant histogram.
d. Select the perturbation with the lowest entropy.
e. Decrease the perturbation step size and repeat until termination conditions are met. A variety of termination conditions may be employed, including a maximum number of iterations, an entropy threshold, a statistical evaluation of the distances around each spike, or other analytical measurement. The final histogram is then analyzed.
7. For each local maximum in the histogram, create a group of points each with a distance to the defined reference plane that falls within a tolerance threshold to the local maximum. Each of these groups represents a planar segment of the original cloud corresponding to a detected plane (step surface or the bottom of the holes).

After the planes are detected in part 1, using either Method 1 or Method 2, the calibration process then analyzes the detected planes to determine the locations of the fiduciary elements in the second part of the process.

Methods 1 & 2—Part 2

Each of the detected planes is analyzed to detect fiducial holes. Referring to FIG. 8, the top plane is cyan, while the bottom of the holes in that plane are magenta. The calibration process may search for these holes on the surface planes rather than by finding the bottom of the holes, because the bottom of the holes may be incomplete due to shadowlike occlusions created by oblique angles of detection. Points on the top surface plane are less subject to such occlusion. To detect each hole, which is represented by the absence of points, the area surrounding the hole must have a sufficiently dense population of points to define the hole boundary.

In order to more tractably approach the detection of holes in each plane, the plane segment, representing the area around the holes, of the point cloud is transformed into a two-dimensional image. This two-dimensional image is processed to detect and locate the holes in the image. The location of each detected hole is then transformed back to the original three-dimensional space of the original point cloud, obtained by recording depth information using a recording device (such as the laser profilometer) that scanned the image by moving relative to the calibration target. The steps in this process are outlined in more detail below, with the motion components (including the scanners, cameras, and platen or conveyor) expressed as the x and y directions, and depth expressed as the z direction.

1. Analyze the point cloud to determine the median (or average) space between points in the x and y directions.
2. Obtain a set of points composing a segmented plane and the associated plane model parameters (from Part 1).
3. Establish an affine transformation matrix that will later be used to map the locations of points on the plane to pixel locations in a two-dimensional image.
4. Calculate the rotational parameters of the affine transformation required to rotate the points along either the x or y axis such that the normal vector of the rotated plane is parallel to the z axis. Record these values in the affine transformation matrix.
5. Determine the values required to scale the points in the x and y directions such that the spacing between points is approximately one pixel.
6. Use the affine transformation matrix to rotate the points such that the resultant plane is parallel to the x-y plane.
7. Analyze the range of x, y, and z values of the resultant point cloud. The minimum values of x and y and the average (or median) value of z are used to create translational values in the affine transformation matrix. With the addition of translational values, the affine transformation matrix completely describes the mapping of points on the plane in three-dimensional space to pixels in a two-dimensional image. The ranges of x and y values express the dimensions of the required image size.
8. Create an image of the plane in which the presence of a point is indicated by one value (e.g. white) and the absence of a point is indicated by another color (e.g. black). FIG. 11 illustrates an example of such an image, with points (corresponding to a portion of a planar surface) shown in white 1101, and areas with no points (corresponding to fiduciary element holes in the surface) shown in black 1102. In creating the image, the range of point locations in the x and y dimension correspond to pixel locations.
9. Optionally, the image may be processed to mitigate noise.
10. Using prior knowledge of the expected appearance of the hole and image processing calculations, detect and locate the holes. A wide variety of image processing techniques can be employed to detect and locate the holes, such as template matching via correlation convolution, Haar object detection, convolutional neural networks, and Hough transformation of edge pixels. Due to the binary nature of the image and the anisotropic scaling of the image, the preferred embodiment employs convolutional template matching using an integral image of the plane.
11. Invert the affine transformation matrix to produce a new matrix (inverse matrix) that maps pixel locations in the image to points in three-dimensional space.
12. Use the matrix to transform the locations of detected holes to their corresponding locations in three-dimensional space.
13. The detected hole centers are used to compute a transformation matrix that determines the orientation of the calibration target in three-dimensional space. The transformation matrix is 4 by 4 for transforming homogeneous coordinates. As such it has only 12 variables since the last row is fixed to be (0, 0, 0, 1). Solving for these 12 values will require four points in three dimensions. Of the various algorithms available for calculating the transformation matrix, the preferred embodiment employs the RANSAC algorithm.

Once the transformation matrix is determined, it is applied to subsequent scan data. Application of the transformation matrix allows for the removal of skew or shear introduced by the relative motion between the object and the scanner combined with the orientation of the scanner.

Object Inspection

Figure 12A:
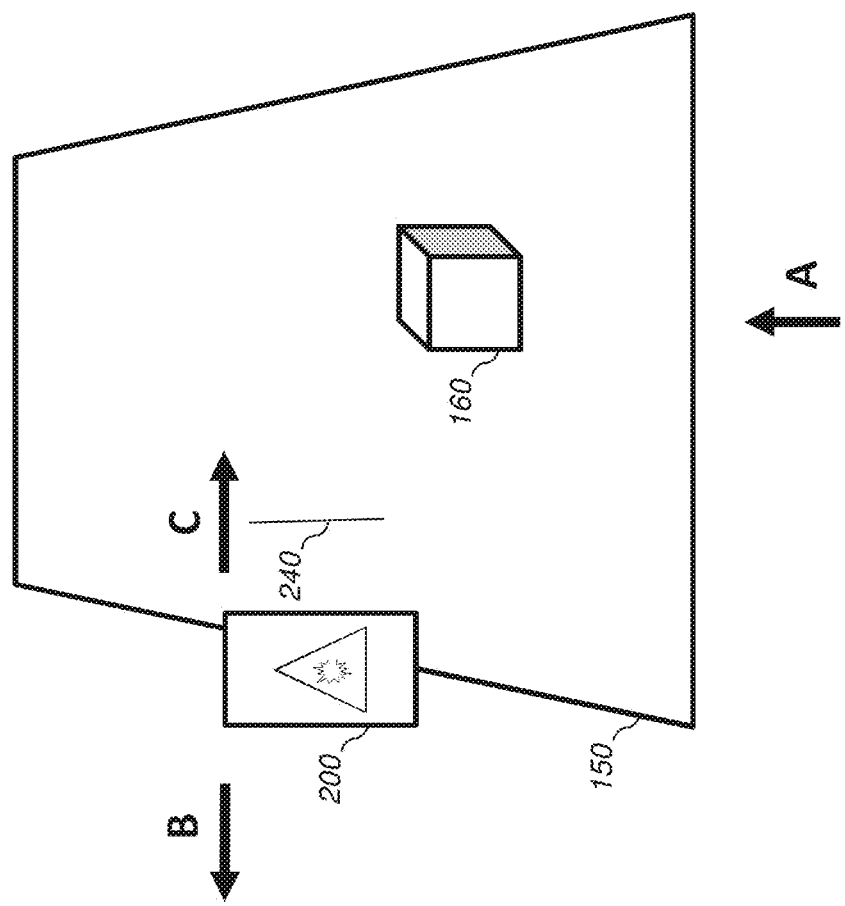
FIGS. 12A and 12B are illustrations of the product inspection system in use, showing motion of the transport and laser module during inspection.
Figure 12B:
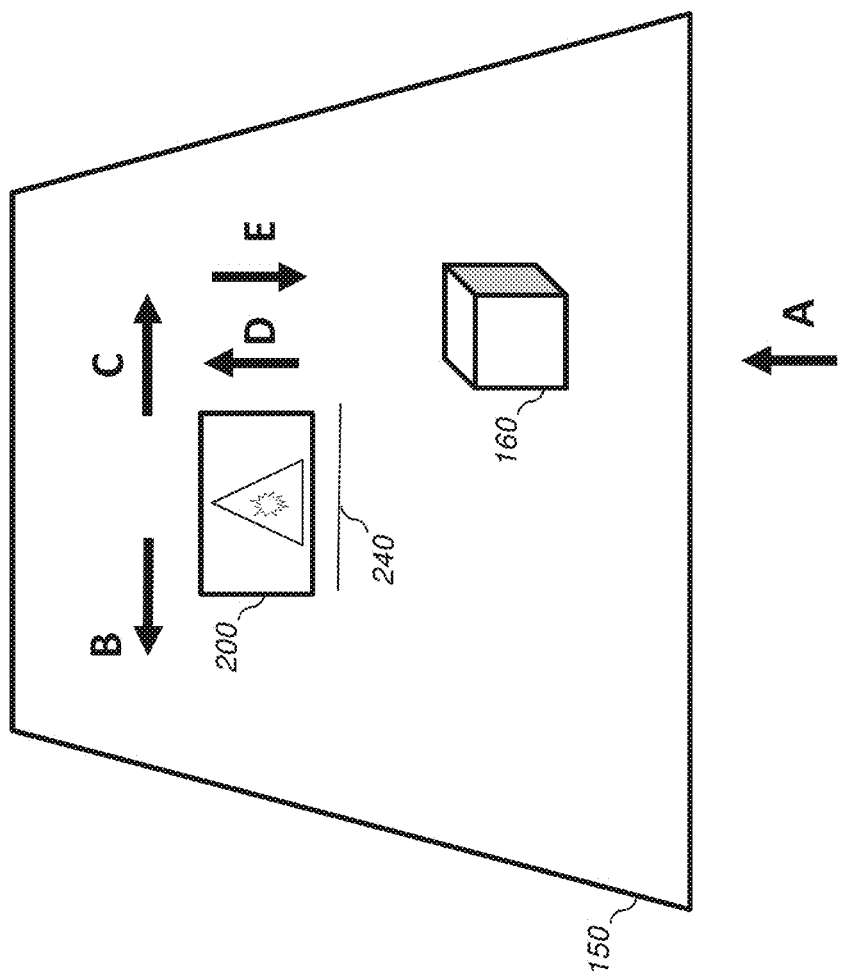

FIGS. 12A and 12B illustrate system configurations for performing the product quality inspection on one or more objects. As shown in FIG. 12A, according to one embodiment the inspection system may include a transport 150 that moves the objects 160 being inspected in direction A. The laser module 200 may be included on guides that allow it to move perpendicular to the transport direction, for example moving in directions B and C as shown in FIG. 12A. As the laser module moves perpendicular to the direction of the transport, the laser field of view 240 it makes multiple passes over the object being inspected. Recall the laser beam 140 forms a line on the transport 150 that corresponds to the field of view 240 which is parallel to the direction of the transport 150 as shown by direction A. During each pass, the laser module's field of view makes multiple scans of the object.

Overlapping scanning (i.e. raster scanning) of the object may be used, which results in reduced noise inherent in translation of both the object 160 on transport 150 and laser module 200, and which increases the sampling resolution. Having multiple data per point on the point cloud allows for reduction in the total scan error by minimizing data variance.

In the configuration shown in FIG. 12A, the laser module 200 may be rotated 90 degrees so that the laser field of view 240 is parallel to the directions B and C. In this case the laser module 200 captures a scan of the object equal to the width of the laser field of view 240. The laser module 200 continues moving across the transport 150 in direction B or C. When the laser module 200 travels a distance equal to the laser field of view 240, the laser module 200 captures another scan. In the alternative configuration shown in FIG. 12B, the laser module 200 may be positioned on guides that allow it to move parallel to the transport 150. The laser may module may move back and forth above the object 160 being inspected, with the reflected laser cone passing repeatedly over the object. In FIG. 12B, the laser module 200 orientation is rotated 90 from FIG. 12A such that the laser field of view 240 is perpendicular to the transport 150 direction. The laser module 200 moves in direction D scanning a predefined area. When the laser module 200 reaches the end of the predefined area, the laser module 200 travels in the direction C by a distance equal to the width of the laser FOV 240 before starting to another scan in the direction E. The laser module continues scanning in directions D and E as the laser module 200 moves in direction C. Once the laser module 200 scans the width of the transport, it repeats the process of scanning in directions D and E as the laser module moves in direction B.

During an inspection process, a known object is placed onto the transport 150 in a predetermined position and orientation. Alternatively, the object is moved along the transport and is first imaged by the optical acquisition unit 110. As noted above, the captured images of the object from the optical acquisition unit 110 are used to both identify the object and to determine its orientation. The predetermined, or determined, coordinate position and orientation of the object 160 on transport 150 can be sent to a processing unit connected to the laser scanning profilometer module. This processing unit may control the laser profilometer so that it scans only the area of the transport where the object is located. Alternatively, the profilometer may be configured to scan the entire width of the transport instead of focusing on a particular region where an object is determined to be positioned. When the profilometer scans the entire transport, the point cloud resulting from the scans is cropped for the region of the transport where the objects exist. When scanning the entire transport width, multiple objects may exist in the same profilometer scan, which can then be separated out during subsequent processing. In addition, the laser profilometer module can locate the part and directly extract the part out from the background.

Once the object being inspected is identified based on the captured images from the optical acquisition unit, a system processing unit loads the CAD data corresponding to the identified object from a CAD model database, and converts it to a uniform point cloud. As mentioned above, a predetermined object may also be loaded, such that it is not necessary to first capture images from the optical acquisition unit. In this situation, the CAD model from the database for the predetermined object is simply loaded. The point cloud from the laser profilometer will be overlaid and registered with the CAD point cloud. The deviation between the CAD point cloud and the point cloud from the laser profilometer is calculated to create a heat map of the differences. By analyzing the CAD model for the object, the point cloud from the laser profilometer and 3-D registered heat map of the difference with the original CAD model, the operator can use the 3-D registered heat map for visualizing any variations of the object from the CAD model. These visualizations of object variations are recorded over time along with object counts, mold cavity positions, material compositions, and other factors relevant to the monitored manufacturing process. The visualizations are presented in a selectable chronological sequence with object illustrations containing with 3-D registered heat maps. Each individual image of the objects is also registered so that an operator can observe a representation of a degradation condition represented by the heat map over a selected period. This form of dynamic visualization can be useful for diagnostic purposes by providing illustrations of wear patterns and for determining in advance when the production of a given object will exceed tolerance by projecting the monitored degradation, preventing the manufacture of defective objects, such as parts or components. To further distinguish between minute variations of the 3-D registered heat maps, visualizations of these variations can be enhanced by using different colors, textures, and or patterns. Calculated and synthesized heat maps projections of the monitored degradations can also be provided for diagnostic purposes.

In addition, a histogram of error can be presented to the operator. The system can be configured to identify and flag parts that exceed predefined tolerance as being defective. The user can configure the system to produce a notification, stop the production or sort the detective part from other parts with the use of a part picker or similar means.

Figure 13:
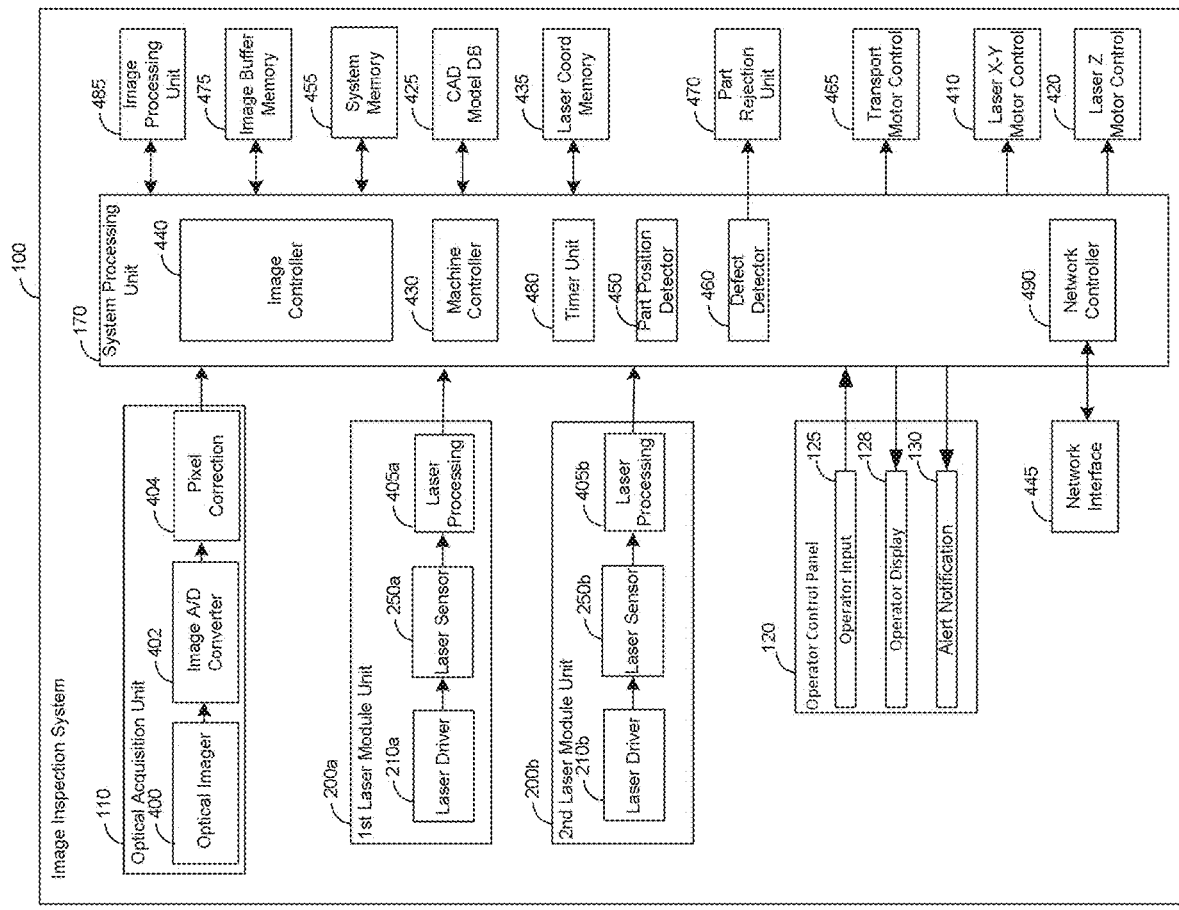
FIG. 13 is a block diagram of the components of the quality inspection system.

FIG. 13 illustrates a block diagram which shows the schematic illustration of the quality inspection system components. As shown in FIG. 13, the inspection system 100 includes an optical acquisition unit 110. The optical accusation unit includes an optical imager 400 to capture images of the objects being inspected, an image A/D converter 402 converts an analog image signal output from the optical imager 400 and generates digital image data which is then output to the pixel correction 404. As noted above, the image device 400 has an image capture element using CMOS (complementary metal oxide semiconductors) which are arranged in a line in the main scan direction which is perpendicular to the transport 150 as shown by arrow A. As noted above, the image capture device could be a CIS (contact image sensor). In addition, it is also possible to utilize an image capturing sensor using CCD's (charge coupled devices) in place of the CIS. The optical acquisition unit 110 could also include a stereo imager. The pixel correction 404 corrects for any pixel or magnification abnormalities. The pixel correction 404 outputs the digital image data to the image controller 440 within the system processing unit 170. As shown in FIG. 13, the system further includes a first laser module 200a, and optionally a second laser module 200b. Although two laser modules are shown, the system may include any number of laser modules. With more laser modules, the system may be able to capture profiles of larger objects, or capture more profiles of complex object during the inspection process. The use of multiple laser modules further minimizes occlusions or shadows. An occlusion is a blockage of the laser beam 140 traveling from laser driver 210a, 210b to object and back to the laser sensor 250a, 250b. For example, by knowing the object orientation as determined by the optical acquisition unit 110 or by using a predetermined object with a known orientation placement, the laser module 200a, 200b mounted within the quality inspection system 100 can be changed manually or dynamically to optimize the viewing angle, field of view, or working distance in order to minimize occlusions or shadows to control the position and motion of the laser module 200a, 200b to get the best scans. Each laser module 200a, 200b includes a laser driver 210a, 210b, a laser sensor 250a, 250b, and laser processing 405a, 405b. The laser processing 405a, 405b may be a microprocessor or processing circuitry, or may include a communication module to receive processing commands from an external processing device. The laser processing packages and sends the unstructured point cloud representing the measurement data to the image controller 440 which stores the data in the laser coordinate memory 435.

The optical acquisition unit 110 sends the digital image data to the image controller 440. The image processing unit 485 then processes the digital image to identify the object being scanned. Alternatively, the object may be a predetermined object and the identification by the optical acquisition unit may not be necessary. Based on the characteristics of the identified object 160 to be inspected, predefined setup parameters or recipes for laser module 200a, 200b may be pulled out system memory 455 to optimize the configuration of the laser module 200a, 200b. The characteristics of the object related to the predefined setup parameters in the system memory 455 may be, for example, reflectivity, color, geometry, or surface finish. Predefined setup parameters or recipes may be laser driver 210a, 210b strength, profiles per second, or exposure.

The operator configures the inspection system 100 to perform the required inspection either through the operator control panel 120 or network interface 445. An operator control panel 120 includes an operator input 125, which may be, for example, a mouse, keyboard, touchscreen, or touchpad. An operator display 128 and alert notification 130 may also be included in the operator control panel. The alert notification 130 may be, for example, a Red, Yellow, and Green light stack, audio alarm or other visual alert mechanism. The network interface 445 allows the system to communicate with external processing units and network devices. The network interface may be connected to a local area network, wide area network, or to the internet through wired or wireless connections. The network interface can be of any form known to those skilled in the art including, but not limited to, Ethernet, USB, Wi-Fi, cellular, or other data network interface circuit. The network interface 445 also provides a means to remotely control the inspection system 100 by supplying various types of information required for inspection. The network controller 490 manages the network interface 445 and directs network communications to a machine controller 430.

A system memory 455 may also be connected to the system processing unit 170, as well as other processing components in the inspection system. The system processing unit 170, and other processing units may be, for example, one or more microprocessors, one or more coprocessors, one or more multi-core processors, one or more controllers, processing circuitry, an ASIC (application specific integrated circuit) or FPGA (field programmable gate array), or a combination thereof. The processing units may be configured to execute instructions stored in the system memory 455 or otherwise accessible to the processing circuitry, such as over the communications network through network controller 490. These instructions, when executed by the processing circuitry, may cause the inspection system to perform one or more of the functionalities described herein. The memory 455 may include volatile and/or non-volatile memory, and may be a hard disk, random access memory, read only memory, cache memory, flash memory, an optical disc, or circuitry configured to store information. System memory 455 may be any non-transitory computer readable storage medium, in communication with the system processing units. The memory may be configured to store information, data, applications, or program instructions allowing the system processing unit 170 and other processing units to control the inspection system and perform the inspection process.

The system processing unit 170 includes an image controller 440 configured to receive and analyze images from the optical acquisition unit 110. The received images from the optical acquisition unit 110 are stored in the image buffer memory 475 to hold the processed images. An image processing unit 485 is connected to the system processing unit 170. The image processing unit 485 is configured to receive the captured images, in digital form and after pixel correction, from the optical acquisition unit and perform further processing on the images. These captured images may be stored in an image buffer memory 475, with is connected to the image processing unit 485, the system processing unit 440, or both. The image buffer memory store recently captured images sent by the optical acquisition unit during an inspection process. As part of the processing, the image processing unit 485 may interact with the image controller 440 of the system processing unit 170. The system further includes a CAD model database 425, which stores CAD data profiles for objects being inspected during the quality control inspection process. This CAD model database 425 may include predetermined CAD profiles of objects anticipated to be inspected, and may further be an updatable database allowing a user to manually, or automatically, store additional CAD profiles in the database for new objects being inspected. For example, the CAD model database 425 may be updated by executing a process to upload CAD models stored on a local memory, or to upload CAD models over the network communication interface.

The image controller 440 is also configured to receive and analyze unstructured point cloud measurement data from the laser module unit 200a and 200b. The received unstructured point cloud data from the laser module unit 200a, 200b are stored in the laser coordinate memory 435 to hold for further processing by the image processing unit 485.

A machine controller 430 is configured to control the operation of the optical acquisition unit 110 and/or the laser module units 200a, 200b. For example, the machine controller may control the timing of the image capturing, and/or use the image capture data to control the movement of the transport 150 includes transport speed, and the movement and scanning of the laser module units. A timer unit 480 may be included in the system processing unit 170, as well as a part position detector 450 and a defect detector 460. The part position detector may be configured to determine the position and orientation of the objects being detected, including position on the transport and orientation relative to either the direction of transport or another fixed coordinate in the system. The defect detector 460 is configured to determine, based on comparisons between the laser module scans of an object being inspected and stored data files regarding expected dimensions of the object, whether the product is within certain tolerance levels. If the product is not within tolerance levels, the defect detector may issue a defect warning. The defect detector may also be configured to determine defects based on the captured images from the optical acquisition unit 110.

A part rejection unit 470 may be in communication with the defect detector 460 in the system processing unit 170. The part rejection unit 470 may receive information from the defect detector 460, and based on a determination of whether the defects meet predetermined quality threshold requirements, issue a command to stop the inspection process, flag the inspected object as defected. The part rejection unit 470 with and the timer unit 480 will track the defective object and take action to remove the defective object from the transport 150 or alert the operator of a defect condition through, for example, the alert notification 130, or the network interface 445.

The inspection system further includes controls for controlling the transport 150 and laser modules 200a, 200b during the inspection process. Transport motor control 465 may control the speed and timing of the transport mechanism that moves the objects along the inspection transport path. For example, the transport motor control 465 may be connected to a motor driving a conveyor belt, platen or rollers forming transport 150, and may drive the motors at varying speeds to control the speed of the objects being inspected. The transport motor control may also stop the transport 150 when a defective object is detected, allowing an operator time to remove the object from the inspection line or take other appropriate action. Two laser motor controls may be included, with a laser X-Y motor control 410 controlling the movement of the laser module 200a, 200b in an X-Y plane, and a laser Z motor control 420 controlling the movement of the laser module units in the Z direction (or height). For example, the laser X-Y motor control 410 may move the laser module units 200a, 200b in the X direction to cause the laser to traverse the width of the transport 150 thereby causing the laser field of view 240 to make multiple scans over the object being inspected. The laser Z motor control 420 may move the laser modules up and down so that the system can inspect objects of varying height. This allows the distance between the laser driver 210a, 210b and the object being inspected 160 to be maintained.

Figure 14:
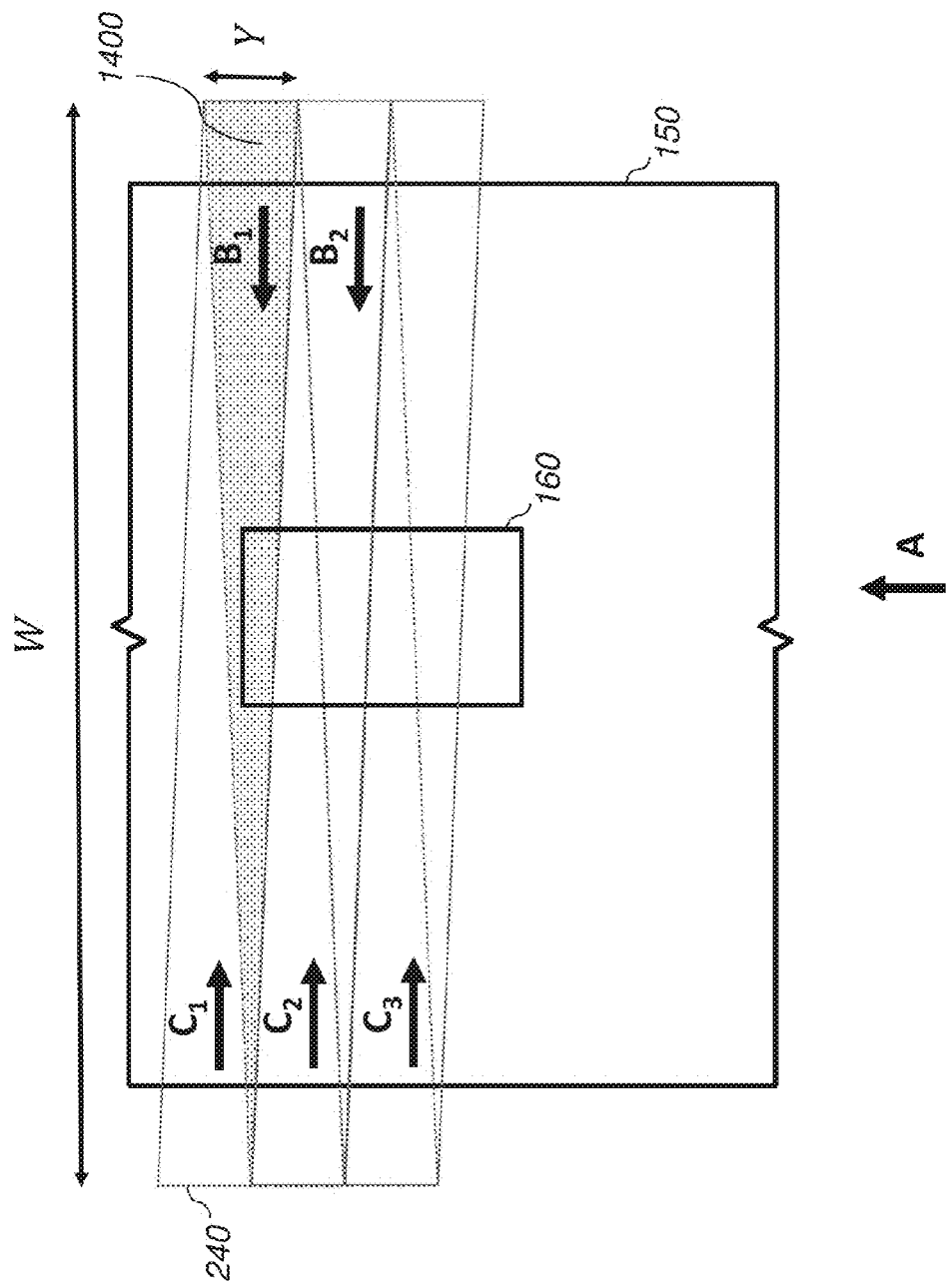
FIG. 14 is an illustration of the scanning paths of the laser system when moving only perpendicular to the transport path

FIG. 14 illustrates movement of the laser module 200 during a scanning process in which the object moves in direction A and the laser module moves only in directions perpendicular to direction A. The laser module 200 is rotated 90 degrees such that the laser field of view 240 is parallel to direction A. As can be seen in the Figure, as the laser module moves in directions B and C, perpendicular to direction A, the field of view 240 of the laser scans a path across the transport 150. As part of a raster scanning process, the laser module alternatingly moves in directions B and C, traversing repeatedly over the object as it conducts the scans. Relative to the object 160 being inspected, the laser module thus creates an overlapping scan pattern with a slant, with the slant being imparted because the object being inspected continues to move in direction A as the scans are performed. This method of scanning creates regions of overlap between successive traversals of the object. The gray region 1400 depicts a region of overlap between traversal $C_1$ and $B_1$. Similar overlap regions are created between each pair of successive traversals. Overlap scanning can be performed by either altering the velocity of the transport 150 or laser module 200. For complete coverage of the scanned part, the following relation must hold true:

$$2 \le \frac{V_B Y}{V_L W}$$

where Y is the length of the laser field of view 240, W is the distance the laser module 200 is scanning across the transport 150 as shown in FIG. 14, and V_B and V_L are the velocities of the transport 150 and laser module 200, respectively. When this relation holds true, the laser field of view 240 will overlap the object being inspected allowing multiple point cloud data points for the same spatial location to be captured. In addition, this allows for calibration of the system with respect to positional discontinuities such as those caused when the transport is not parallel to laser module.

The angular relationship between laser field of view and the transport may also be considered. If the angular relationship is not zero degrees, meaning they are not parallel, one end of laser field of view will be closer to the transport than the other end. Since the object being scanned is moving in direction A as shown in FIG. 12A, any point on the surface of the object will appear to increase or decrease in Z direction or height based on the angular relationship of the laser field of view with respect to the transport. As laser module traverses in directions B and C as shown in FIG. 14, each laser traversal over the object will create a stair step in the scanned data in Z direction as the object travels through this laser field of view angular relationship in direction A. This angular relationship can be compensated for by performing a calibration. In this calibration, a scan of the transport is performed without any object present. Any difference in height between the two end points of the laser field of view is known to be due to the angular relationship. The angular relationship may be stored in system memory, allowing the system processing unit to subtract out any stair step in the scanned data.

Similarly, the angular relationship direction A of the object must be zero degrees with respect to the laser field of view. In this case, any point on the surface of the object will appear to move in either directions B or C based on the angular relationship of the laser field of view with respect to the transport direction A. In this calibration, a scan of a calibration target is used to determine the angular relationship. Any stair stepping difference along the edge between two laser module traversals is known to be due to the angular relationship. The angular relationship may be stored in system memory allowing the system processing unit to subtract out any stair step in the scanned data.

The distance W that the laser module is scanning across the transport may be the width of the transport 150 when scanning the entire transport, or W could be a region of the transport if the position of the object on the belt is known. By setting W to correspond to only a region of the transport when the position of the object is known, higher scanning throughput at the same resolution, or the same throughput at a higher resolution, may be achieved.

By performing this overlapping scanning process, objects larger than the laser field of view 240 may be scanned, and the noise is also reduced. This configuration allows the capture of higher resolution images based on the distance between motor steps and acquisition rate when traversing the laser over a larger area, and not limited to the native resolution of the profilometer itself.

As noted above, performing the overlapping scans helps to reduce sensitivity to noise. Noise is introduced by inherent measurement error and mechanical noise due to the object and laser module 200 moving in the inspection process. By performing scanning so that there is an overlap of the scanning of segments of the inspected object, multiple point cloud data points for the same spatial location on the object are created. This multiplicity of point cloud points for a single spatial location allows for the calculation of a mean and variance (or confidence interval) for that spatial coordinate. By scanning portions of the inspected part several times and averaging the data, overall noise in the system is not only reduced, but remaining noise can be accurately calculated and reported. More details regarding the procedure for maintaining the performance of the scanning system are described herein.

Regions of overlap may be created between consecutive traversals by only moving along one axis at a time. For example, the object may be stationary in the A direction while the scanners move in the B or C directions. In this case, the overlap regions would be rectangular shaped.

Figure 15:
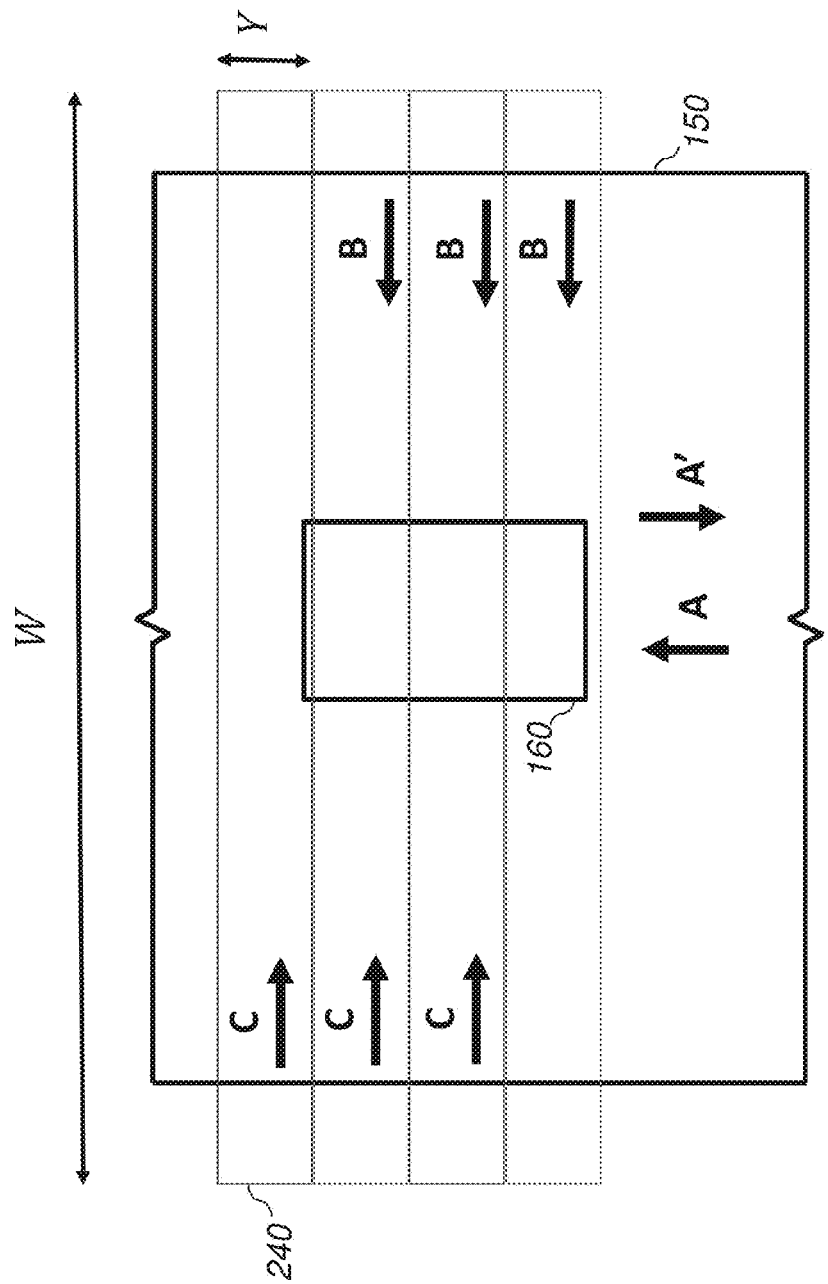
FIG. 15 is an illustration of the scanning paths of the laser system when the laser system moves both perpendicular to and in the same direction as the transport path.

FIG. 15 illustrates a scanning process in which the laser module 200 moves in the same direction as the object 160 along the transport path 150, as well perpendicular to the transport path. By moving in the same direction as the object, and at the same speed as the object in that direction, no slant is introduced in the scans. For example, as shown in FIG. 15, laser module 200 may move in direction C perpendicular to the direction of motion A of the object 160 along the transport 150, with the laser field of view 240 scanning a path across the transport 150 in a raster scanning process. Unlike in FIG. 14 where the laser module 200 only moved in directions B and C perpendicular to direction A, in the process shown in FIG. 15 the laser module 200 also moves in direction A at the same speed as the object as it conducts the scan. When the laser module reaches the end of a scan, it then moves a distance A' that is equal to the length of the field of view 240 of the laser. Then, the laser module 200 reverses direction and moves in direction B while at the same time moving in direction A at the same speed as the object 160. Thus, relative to the object 160, the laser module 200 makes a scan of the entire object once, as shown in FIG. 15.

Figure 16:
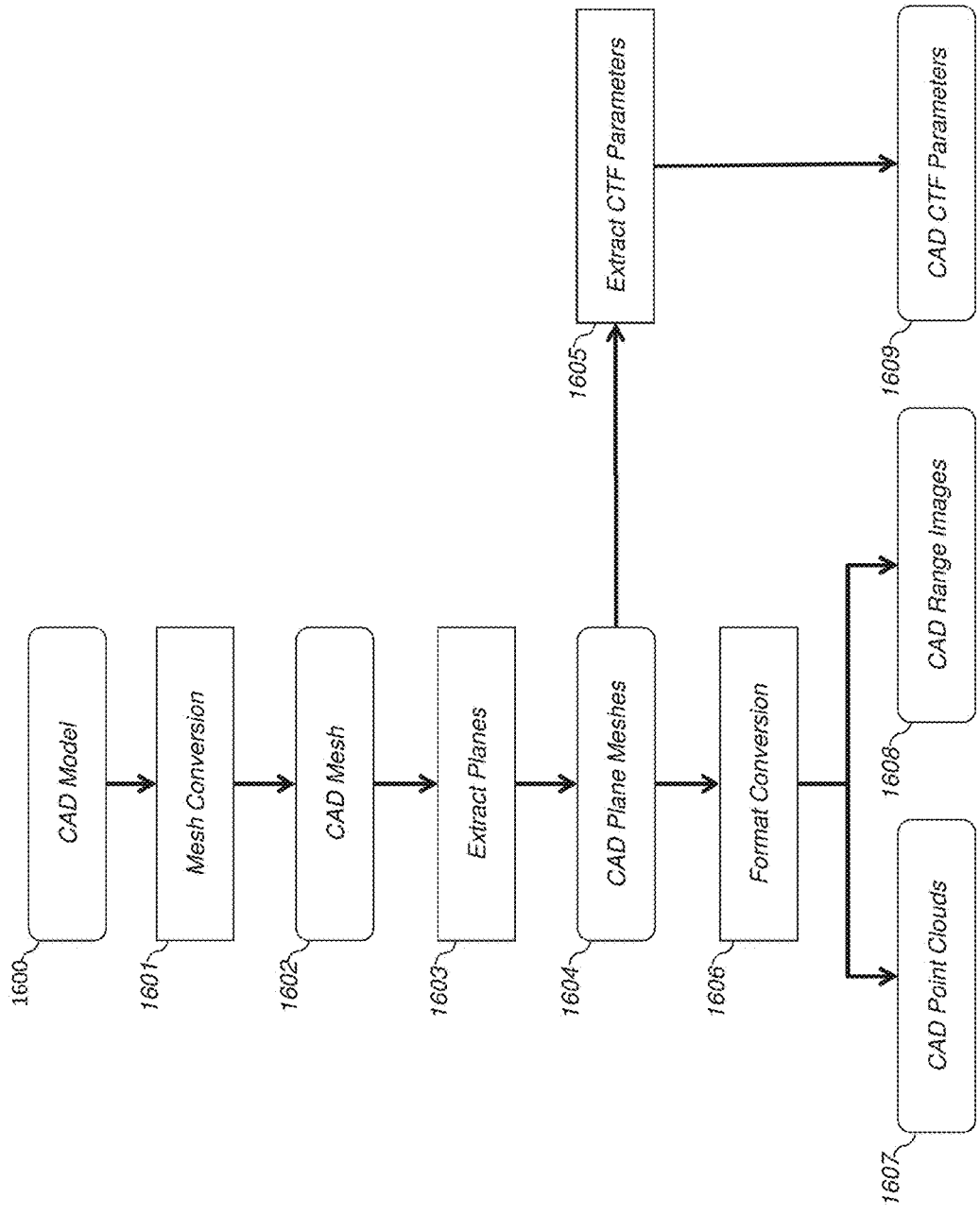
FIG. 16 depicts the details of the processing of converting stored CAD models of an object into a point cloud for comparison to the point cloud from the laser system.

FIG. 16 is flow diagram illustrating the processing performed to convert the CAD models into a format useable for interfacing with a corrected 3-D point cloud data obtained from the laser module 200 scans of an inspected object. The CAD models can be dgn, dwg, dxf, or stl file formats, or other formats that allow generation of a CAD file. This process may be performed in real time as the objects are being inspected, or can be performed prior to initiating a quality inspection on objects. When performed prior to initiating an inspection, CAD models of the objects anticipated to be inspected may be retrieved and processed, with the results being stored in CAD model database 425. As shown in FIG. 16, a CAD model 1600 is loaded into the system, and mesh conversion step 1601 is performed on the CAD model, resulting in a CAD mesh 1602. Then, extract planes step 1603 is performed on the CAD mesh 1602 resulting in CAD plane meshes 1604. The CAD plane meshes 1604 represent a plane or view of the object from a predefined point of view. These planes or views may be manually generated in advance by editing the CAD model using CAD editing software such as MeshLab and are available to the extract planes 1603 step. This may be done so that the CAD point of view matches with the predetermined object location and orientation, set by the operator placing the operator at a particular location and in a particular orientation in the inspection system. In an alternative embodiment, the planes or views can be automatically identified based on the natural rest positions of the object in reference to the orientation of the transport. The orientation of transport may be obtained by over scanning the object to capture the transport in the scan. Once defined, these planes can automatically be generated.

The critical to function (CTF) parameters for the CAD plane meshes 1604 may then be extracted by the extract CTF parameter step 1605. These CTF parameters are user defined dimensions that need to be measured and verified. These parameters can be manually identified by an operator, or can be determined automatically by system processing. For example, many times a soft- or hardcopy drawing of the object is provided with tolerance and CTF data included, which can be extracted using document processing or OCR software. Based on the extract CTF parameter step 1605, CAD CTF parameters 1609 are generated and stored in the CAD model database 425. The CAD plane meshes 1604 also undergo format conversion step 1606 to generate CAD point clouds 1607 and CAD range images 1608 which can also be stored in the CAD model database 425. CAD range images 1608 represents the six faces of the object being inspected.

Figure 17:
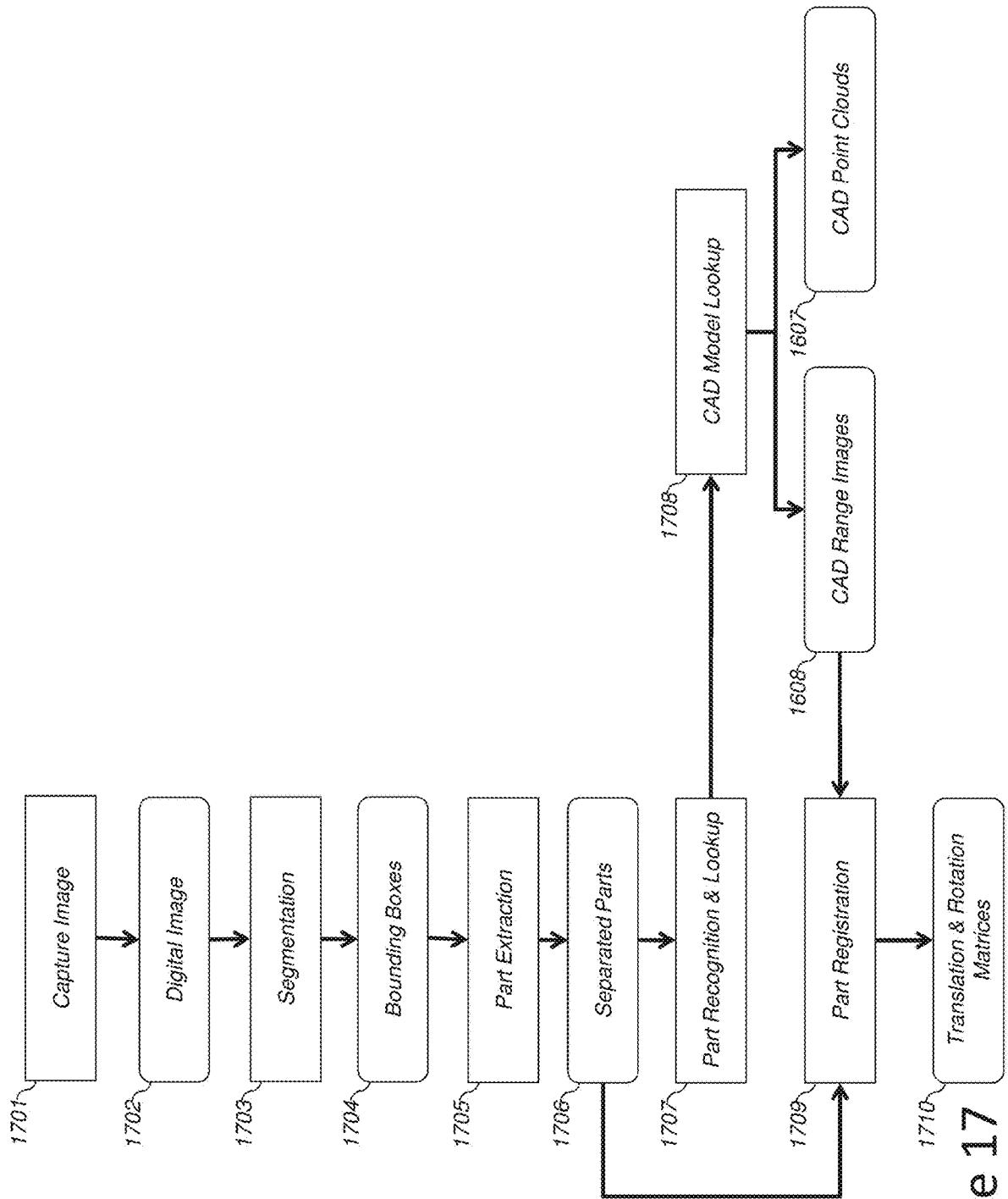
FIG. 17 depicts the details of the processing of image data from the optical acquisition unit to identify the objects being inspected.

FIG. 17 is a flow diagram illustrating the processing performed on image data from the optical acquisition unit 110. This processing includes identifying the objects on the transport 150 being inspected, as well as the position and orientation of the object 160 on the transport 150. As shown, the optical acquisition unit 110 performs an image capture 1701 of the object 160, producing at least one digital image 1702 of that object. The digital image 1702 then undergoes a segmentation process step 1703, and bounding boxes 1704 are generated that can be applied to the digital image 1702 to locate areas of interest that may be an object or feature of an object being inspected. These bounding boxes 1704 may be used as input to system processing unit 170 to determine the scanning area of laser module 200. In part extraction step 1705, separated parts 1706 within the digital image 1702 defined by the bounding boxes are extracted. A part recognition and lookup process 1707 is then performed on each separated part 1706 from the digital image 1702. As part of this process to recognize the objects, a pattern matching process is performed in which the system performs a CAD model lookup 1708 to compare the objects located in the CAD model database 425 to separated parts 1706. The bounding boxes 1704 may include different objects being inspected that require different CAD models to be referenced. The pattern matching processing may be any commonly known pattern matching algorithm. When a match is found in the CAD model database 425, the pertinent CAD point cloud 1607 is identified for later processing. Further, the CAD range image 1608 is identified and then used in the part registration step 1709 to identify the translation & orientation matrices 1710, which are used to rotate the CAD data to match the orientation of the point clouds obtained from the laser module 200 scans of the object 160, as explained below. In an alternative embodiment, the surface dimensions of the objects 160 in the digital images 1702 may be determined, and used as an alternative to the pattern matching used in the part recognition and lookup process 1707.

Figure 18A:
FIG. 18A depicts the processing to merge data from the laser system with CAD model information to determine differences between actual object dimensions and expected object dimensions.

FIG. 18A illustrates the process to merge data from the laser module scans with the information obtained from the CAD model information for the object being scanned. This process determines differences between the actual object dimensions obtained from the laser scans, and the expected object dimensions based on the CAD model tolerances. As shown in FIG. 18A, raw, unstructured point cloud data 1810 is obtained from laser module scans of the object 160, as described above with respect to FIGS. 14 and 15. Due to the continuous traversing of the part, while the laser module scans orthogonally, line profile data sets (raw point cloud data acquired by a single laser field of view 240 line from the laser driver 210) will be offset from one another by a distance equivalent to v*Δt, v being the traversing velocity of the object, and Δt is the time interval between the a line scan of an object and the next line scan. Alternatively, the timer unit 480 generates a trigger signal to the laser module 200 to capture a line profile. Timer unit 480 also generates a trigger to machine controller 430 to capture positional data of the transport and laser module. Using the trigger signal allows the system to read positional data from, for example, an encoder, as opposed to calculating the position based on velocity. In both cases, a rephasing of the raw point cloud data 1811 is implemented to align and average these multiple point clouds together in a single rephased object point cloud 1812. To acquire an accurate point cloud representation of the object, the raw point cloud data is rephased by translating all points in the point cloud by an amount equivalent to −v*Δt. Alternatively, Δt can be taken to be the total time elapsed from a set time, for example the time at which the machine was engaged, to the current line scans timestamp.

The object being inspected is then registered to the CAD model 1813 for that particular object. As part of this registration process, the CAD point cloud 1607 is retrieved, as well as translation and rotational matrices 1819 to match the CAD point cloud to the rephased object point cloud 1812. The rephased object point cloud is also registered at 1814 to the CAD model, resulting in a point cloud aligned to the CAD model. That is, the obtained rephased point cloud is overlaid on the CAD model information for the particular object. The differences between the CAD model point cloud 1607, which comprises structured data, and the registered point cloud 1814 are then calculation at step 1815. Subtractive matching may have been conducted to register the CAD model to the point cloud data as closely as possible. This matching finds a minimum total variance between the CAD model and the point cloud to determine the optimal overlay between the two. In calculating the differences 1815, for each point on the CAD model that has an associated rephased point cloud point, a D value is calculated representing the absolute difference between these two points' spatial coordinates. This D value will be calculated as the magnitude of the vectors of the two points.

$$D=\sqrt{(|x\_1-x\_2|)^2 + (|y\_1-y\_2|)^2 + (|z\_1+z\_2|)^2}$$

where x, y, and z represent the spatial coordinates of the CAD and point cloud data.

This same D value is used in the CAD model registration process mentioned above, with the CAD model being registered to the point cloud data based on the orientation where the variance of D values is at its minimum.

After the differences are calculated, in the form of the D values for each point, a set of point cloud differences 1816 is obtained. A heat map creation process 1817 is then implemented to generate a heat map 1818 showing areas of high deviation between the CAD model and the obtained point cloud from the object scans. The heat map may be used by an operator to determine if the deviations between the dimensions of the actual object being inspected, and the expected dimensions of that object from the CAD model database are outside of predetermined tolerance levels set in the extract CTF parameters 1605. If the heat map 1818 shows areas outside the tolerance levels, the part may be identified as defective. The heat map may be user configurable, with the user setting predetermined limits for when a deviation will be considered relevant enough to indicate on the heat map.

Figure 18B:
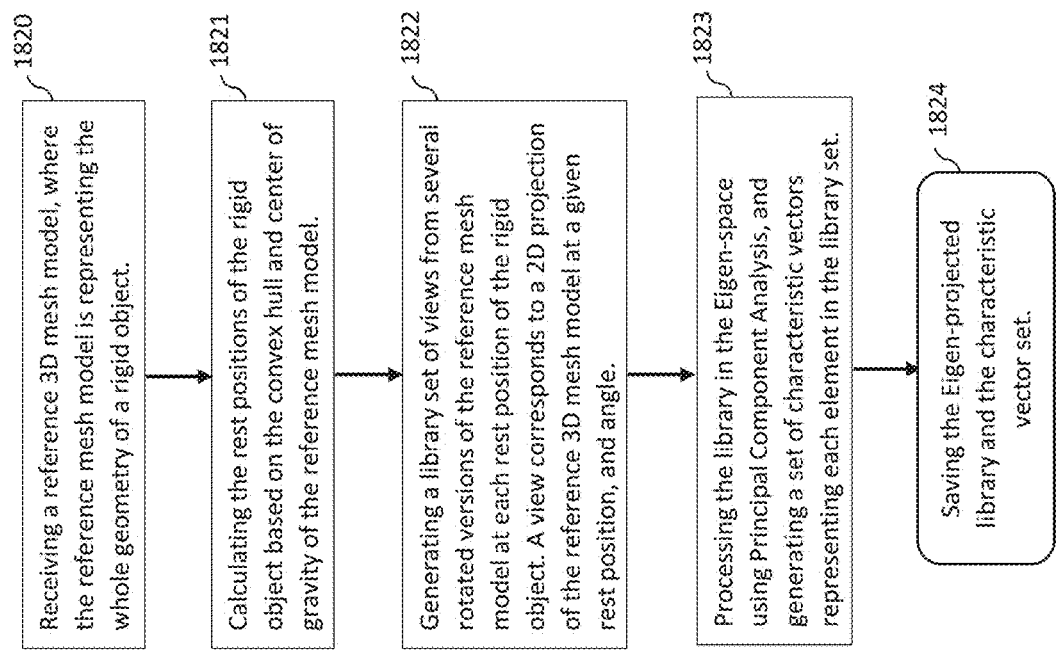
FIG. 18B depicts a system flow diagram for library generation of an object based on its reference mesh model.
Figure 18C:
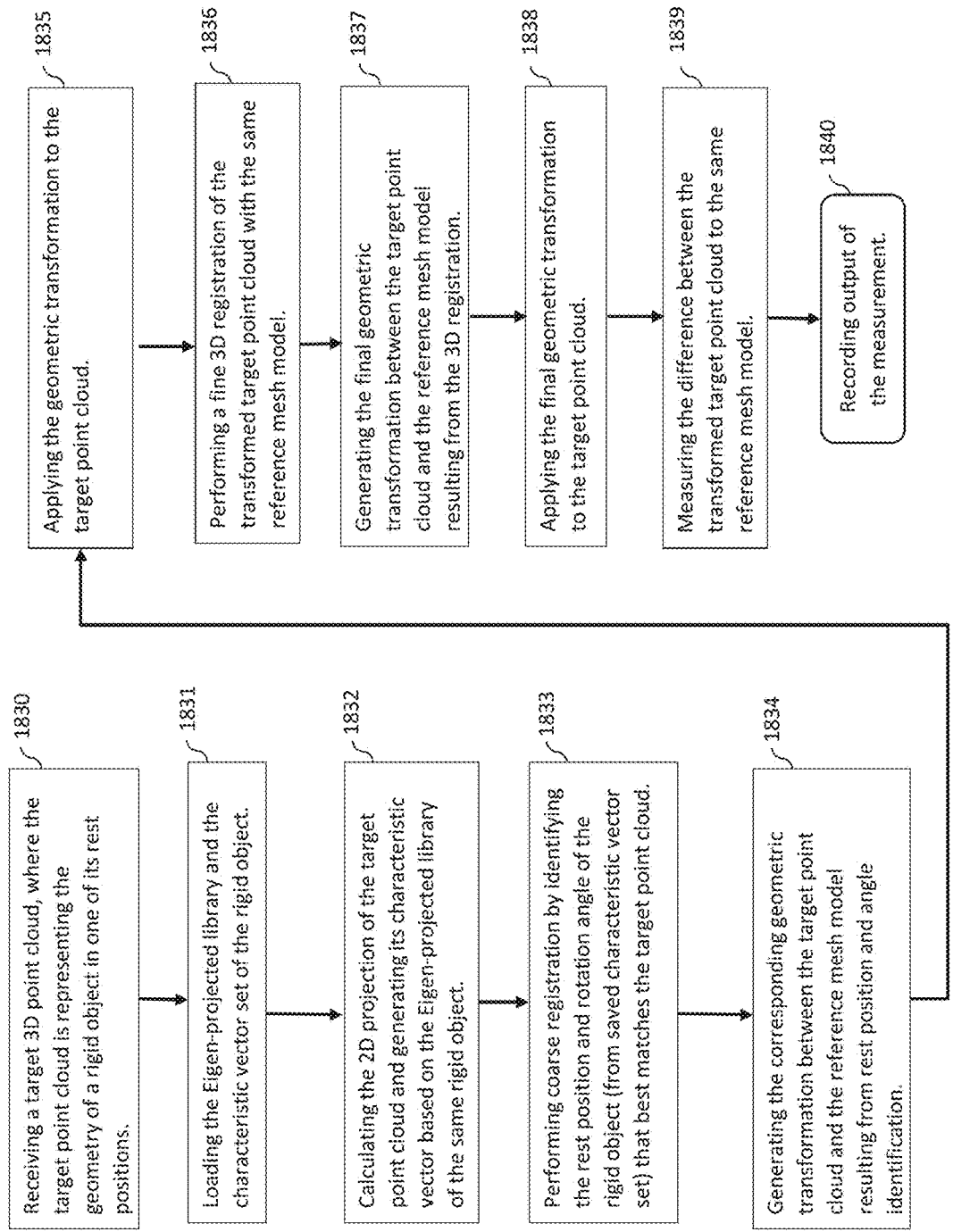
FIG. 18C depicts a system flow diagram for registering and matching a target point cloud to a reference mesh model.

FIGS. 18B and 18C illustrate details of the registration process 1813 from FIG. 18A. The overall registration process is divided in two stages: 1) library generation, and 2) point clouds registration. FIG. 18B depicts the library generation steps to create a set of characteristic vectors (or weights) for use in the next stage. As shown, the system receives a reference 3D mesh model 1820 representing the whole geometry of a rigid object. Then, the various rest positions of the rigid object are calculated based on the convex hull and center of gravity of the reference mesh model 1821. The rest positions of a rigid object are position where the object is stable on a horizontal plane. For each of these rest positions of the rigid object, a library of views from a number of rotated versions (e.g., 360 at 1-degree increment) of the reference mesh model is generated 1822. Specifically, a view corresponds to a 2D projection of the reference 3D mesh model at a given rest position and a specific angle. Note that down-sampling may be applied during the 2D projection process to reduce computational cost. The library of views is then processed in the Eigenspace using a Principle Component Analysis to generate a set of characteristic vectors (or weights) for each element in the library set 1823. The elements in the library set may be determined by performing Eigen decomposition on the generated set of library views 1822 corresponding to the rotated versions of the images of the rest positions, after subtracting out the mean image (which is the average of the set of views). The data after subtracting the mean contains information regarding the differences between the set of views. The top eigenvectors, corresponding to the highest eigenvalues, are chosen to generate a projection matrix. Each image in the set of library views has its vector representation, w, in Eigenspace computed by multiplying with the projection matrix to generate the characteristic vectors. Finally, the system saves both the Eigen-projected library (or projection matrix) and the characteristic vector set 1824 in a library for use in recognizing new point clouds generated in future scans. If more than one rigid object is considered in the system, the steps 1820 to 1824 can be repeated to generate the final library (or projection matrix) and characteristic vector set. These saved library and characteristic vector set will be used in the next stage for 2D and 3D point cloud registrations as described in FIG. 18C.

FIG. 18C depicts the process of 2D and 3D registration and matching of point clouds. As shown, the system receives a target 3D point cloud 1830, which may be the rephased part point cloud. This target point cloud represents the geometry of a rigid object in one of its rest positions. The corresponding rigid object could be one of the rigid objects considered in the previous library generation stage. Next, the saved Eigen-projected library (or projection matrix) and the characteristic vector set are loaded 1831. Then, in step 1832, the 2D projection of the target point cloud is calculated to generate its characteristic vector (weights) based on the Eigen-projected library generated from the previous stage. Again note that down-sampling may be applied during the 2D projection process to reduce computational cost. The Eigen-projected library is assumed to be generated using the same rigid object. In step 1833, a coarse registration is performed by identifying the rest position and rotation angle of the rigid object that best matches the target point cloud. This is achieved by finding the best match or closest distance between the characteristic vector from the target point cloud and the saved characteristic vector set of the rigid object(s) with the corresponding reference mesh model(s) from the previous stage. A metric, such as the least mean squares error or other error metrics, can be used to compute the distance (or matching error) between the characteristic vectors. The match can be also computed as an Euclidean distance between the two vectors. The search for the closest match can be optimized by using a KD-Tree representation to store the vectors. The object and the orientation of the closest match is output as the hypothesis for the object and orientation of the object represented by the target point cloud.

Then an initial corresponding geometric transformation between the target point cloud and the reference mesh model resulting from the rest position and angle identification step is generated 1834. The translation is computed as the difference in the position of the centroids between the image from the 2D projection of the target point cloud and the closest match determined above. The rigid 2D geometric transformation includes information such as translational and rotational matrices. Next, the geometric transformation obtained is applied to the target point cloud 1835. The output of this step is a translated and rotated target point cloud that will be coarsely aligned with the identified reference mesh model (and the associated rigid object). This may be implemented as a 3D transformation matrix, T, using the computed translation and rotation. The transformation matrix T is applied to align the target point cloud with the CAD model, producing a registration between the point cloud and the CAD model.

This is followed by a fine 3D registration step 1836 that completes the whole registration process. In some situations, the scanning process can produce artifacts in the scan data, resulting from secondary reflections of the laser off of the surface being scanned. This typically occurs in concave portions of the surface, or in areas of the part that are close to parallel with the laser path. The resultant artifacts appear as small clusters of points distinctly separated from the main point cloud. These are effectively filtered by the following artifact filtering method.

At each point in the cloud, all nearby points are identified within a predetermined connectivity radius threshold. These points are then all considered connected. Points that are directly connected are logically clustered together. Secondary connections also constitute connectivity. So, if point A is connected to B, and B is connected to C, the A is connected to C. This relationship is determined over the entire point cloud, which ideally results in one large contiguous connected cluster, representing the entire scanned surface. If artifacts are present, they are typically not connected to the main point cloud, and will be in a separate cluster. Once the connectivity of all points has been established, the filtering may be achieved several methods.

First, and most simply, one can accept the primary largest cluster as the only useful points, and discard all others—leaving just the biggest connected cluster as the point cloud. Second, is to sort the clusters by size (number of points) and then incrementally aggregate them in descending order of size, until a predetermined percentage of all the original points have been included. This may include the largest connected cluster alone, or the largest and one or more smaller ones. This method allows for scans of geometries where the actual surface data has discontinuities in it due to the geometry of the part. For instance a large vertical step that is parallel to the laser light, so no points are acquired on the vertical surface of the step. Finally, a third method is to aggregate all point clusters larger than a predetermined size threshold (in either point count, or geometrical dimensions) into the output cloud.

The fine 3D registration 1836 may use algorithms such as the Iterative Closest Point (ICP), which is a popular algorithm due to its simplicity. The inputs of the algorithm are the target and reference point clouds, initial estimation of the geometric transformation (from step 1834) to align the target to the reference, and criteria for stopping the iterations. The output of the algorithm is a refined geometric transformation matrix. The algorithm includes:

1. For each point (from the whole set of vertices usually referred to as dense or a selection of pairs of vertices from each model) in the target point cloud, matching the closest point in the reference point cloud (or a selected set).
2. Estimating the combination of rotation and translation using a root mean square point to point distance metric minimization technique, which best aligns each target point to its match found in the previous step. In addition, the points may be weighted and outliers may be rejected prior to alignment.
3. Transforming the target points using the obtained transformation.
4. Iterating (re-associating the points, and so on).

Then, the final geometric transform between the target point cloud and the reference mesh model is determined 1837 based on the refined geometric transformation matrix obtained in the above fine 3D registration step. Note that in general a geometric transform is an affine transform consisting of one or a combination of translation, scale, shear, or rotation transformations.

The finer 3D registration and iterative process to determine the refined geometrics transformation matrix may also be implemented using an Iterative Closest Face Registration Iterative Closest Face (ICF) algorithm instead of the ICP algorithm. ICF is an algorithm that iteratively optimizes a transformation matrix to rotate and reposition a point cloud so that it is optimally aligned with the CAD model mesh. In ICP, a movable point cloud is aligned to a stationary reference point cloud over the course of multiple iterations. In ICF, a movable point cloud is aligned to a stationary mesh. In both algorithms, the resultant transformation matrix is typically constrained to only perform translation and rotation. There is no spatial distortion, and usually no scaling.

In both algorithms, iterative passes are made, with the alignment becoming progressively closer to the ideal after each pass. In each pass of ICP, the closest point in the reference point cloud is found for each point in the movable point cloud. An error vector is computed for each point in the movable point cloud. After all the error vectors are found, they are aggregated to form a corrective translation and rotation of the point cloud. The corrective translation and rotation are compounded to the transformation matrix being optimized, and the process repeated. In contrast, ICF locates the nearest point that is on a face of the CAD model mesh during each pass, instead of utilizing the nearest point in a reference point cloud. This point may occur anywhere on the continuous planar surface of any face of the mesh, within the boundaries of the face, at the edge of the face, or at one vertex of the face. It may not occur on the extended face plane outside the boundaries of the CAD model face.

A CAD model mesh may be very 'sparse' in vertices. For example, a simple cube model may only contain 8 points. Using just those 8 points, ICP could only relate every point in the movable point cloud to one corner of the cube. This will not produce a good fit to the model, particularly when the point cloud contains point on all surfaces of the cube. To circumvent this problem, a CAD mesh can be interpolated over all its faces, to produce a point cloud that has a uniform grid of coverage over all the surfaces. ICP is then performed relative to the interpolated CAD point cloud, rather than the original mesh. In this interpolated CAD mesh approach, ICP has a granularity/quantization error arising from the discrete points at which the interpolation is performed. ICF does not require interpolation of the CAD mesh, which saves processing time. Instead, ICF uses triangular planar segments in which each face is described by the equation $ax+by+cz+d=0$ and spatial extent of the planar segment is limited by its three vertices. Provided three-dimensional vertices A, B, and C, the values of a, b, and c can be determined from the cross product of the vectors AB and AC. The value of d can be determined by substituting the values into the equation and solving for d using one of the vertices. Because planar segments can describe large spatial regions using only three points, CAD models are typically far more compact than point cloud representations of the same object. In the ICF process, the point on the CAD model surface, that each movable point is optimized toward, is precisely located without the granularity/quantization error that may be present in the ICP approach. ICF also allows for reduced memory utilization as the algorithm is executed, because the CAD model, which is more compact than the point cloud, can be used without interpolation, as well as potentially faster computation because fewer reference faces need to be searched to find the nearest.

Whether ICP or ICF is used to iteratively optimize a transformation matrix to rotate and reposition a point cloud, the final geometric transformation resulting from the process is then applied 1838 to the target point cloud to obtain a final alignment or registration with the reference mesh model. Finally, the difference between the transformed target point cloud and the same reference 3D mesh is measured 1839. The matching result is recorded online or passed to the next step of the inspection system 1840.

Figure 19:
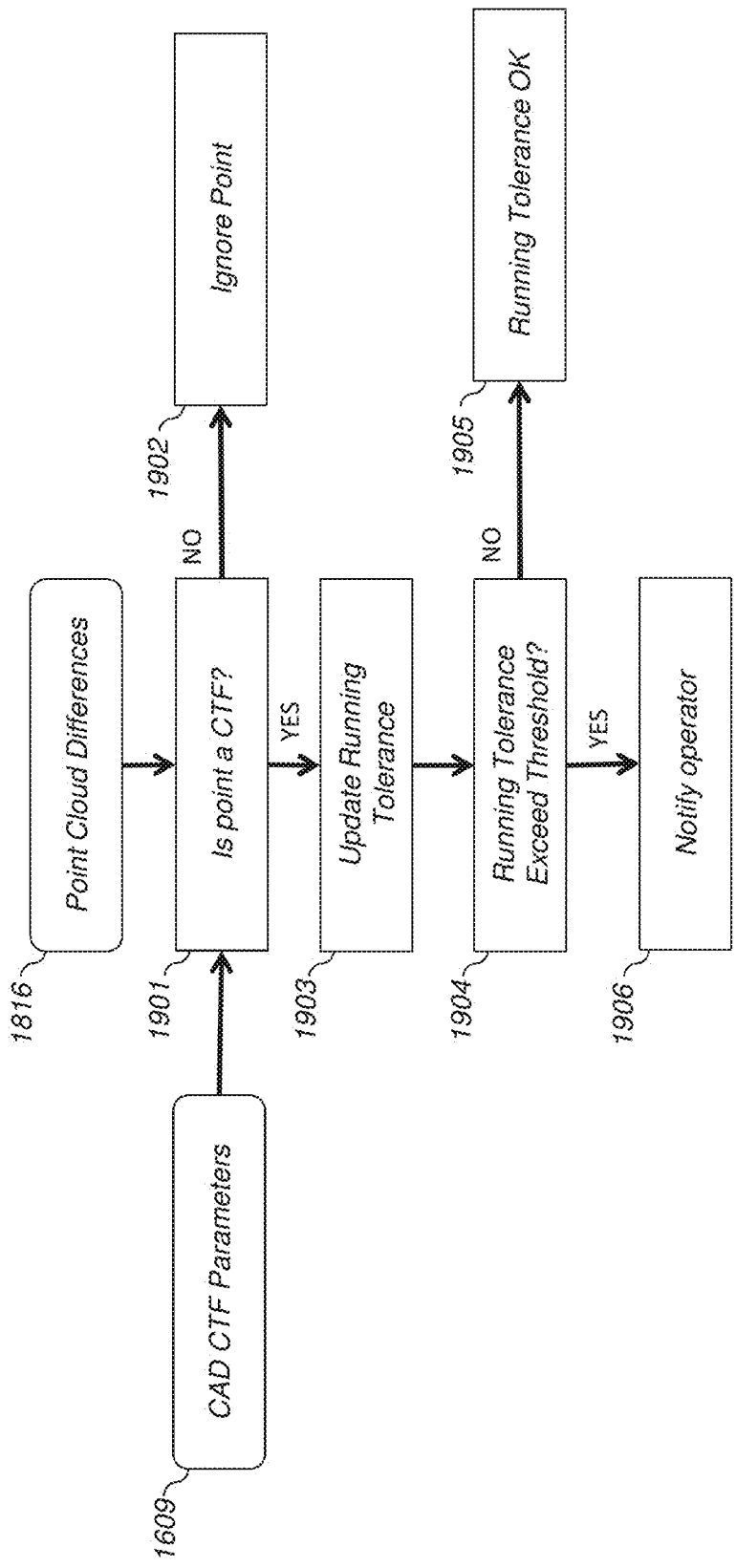
FIG. 19 depicts the processing of the tolerance determinations made by the system and method.

FIG. 19 provides an illustration of how the quality inspection system checks for defects in the objects being inspected. For example, the system may automatically check tolerances to the defined CTF specifications and will notify an operator if system tolerances are being exceeded during the inspection of an object. For example, when manufactured parts coming from a mold are being inspected, the mold will wear over time. As the mold wears, the parts coming from the mold will have dimensions altered from the expected dimensions in proportion to the amount of wear on the mold. When a mold becomes overly worn, the parts produced will no longer be within the tolerance range for their proper and intended use. As shown in FIG. 19, the point cloud differences 1816 calculated for each point in FIG. 18A, along with the CAD CTF parameters 1609 are also retrieved, and are used to determine whether each point in the registered point cloud is a CTF in step 1901. If a point is not a CTF point, then the point is ignored at 1902. However, if the point is a CTF, then an update to the running tolerance is performed at 1903. A check is then made to determine if the running tolerance exceeds a predetermined threshold at 1904. If the threshold is not exceeded as defined by the extract CTF parameters 1605, then the running tolerance is determined to be within acceptable limits at 1905. However, if the running tolerance exceeds the predetermined threshold, the system issues a notification 1906 to the operator.

The defective object may also automatically be removed from the transport 150 using any commonly known removal method in the industry. Defects specific to manufacturing of parts by injection molding may include flow lines, burn marks, sink marks, jetting, delamination, short shot, flashing or other defects. CAD CTF Parameters 1609 may also include surface defects or optical characteristics such as, but not limited to, color, texture or finish in order to identify contamination such as dust, oil, or other foreign objects present in the separated parts within the digital image captured by the image acquisition unit 110. In this embodiment, step 1901 would determine if the optical characteristics exceeds the specified optical CAD CTF Parameters.

Figure 20:
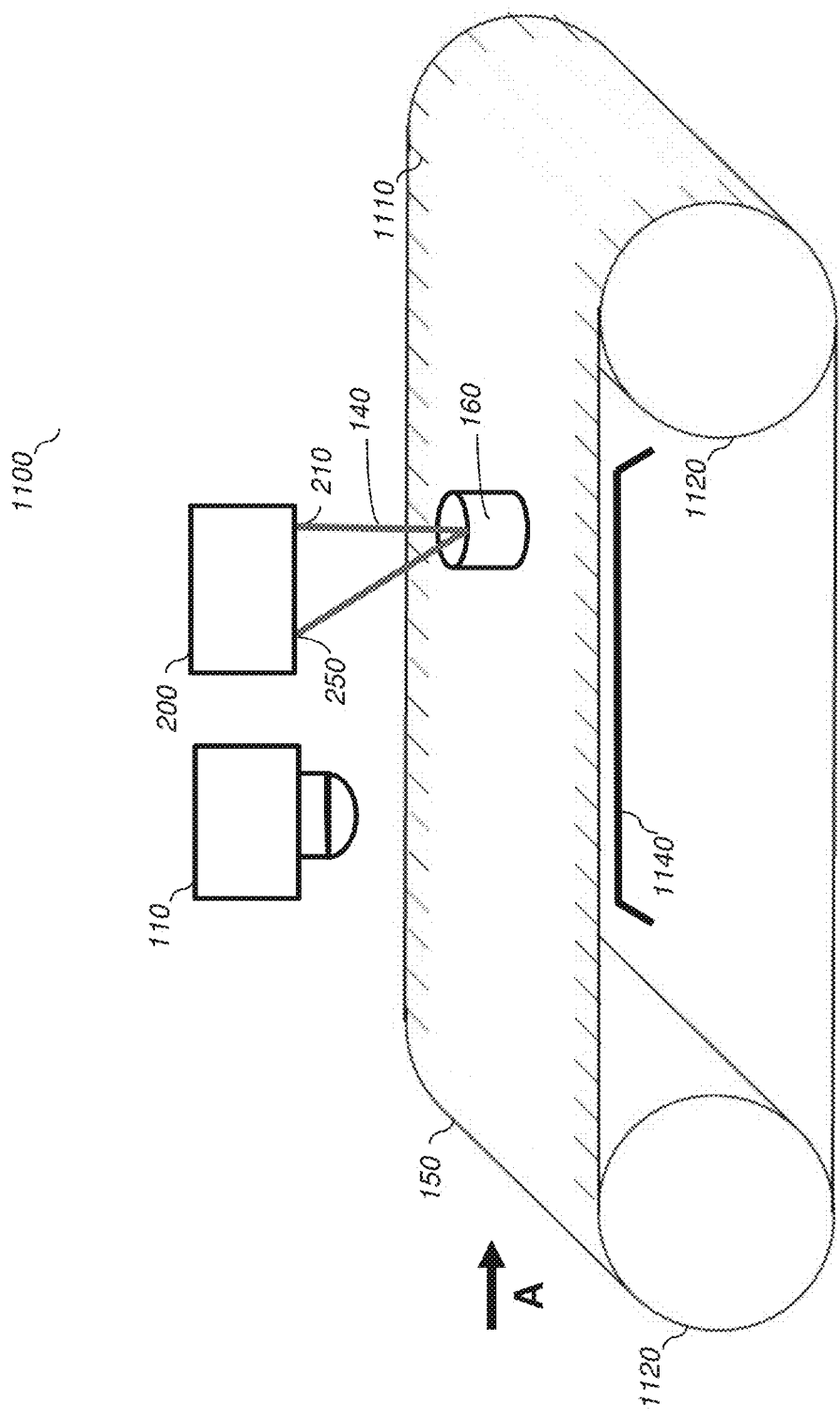
FIG. 20 depicts an example of a transport system that may be used in the inspection system to move objects being inspected past the optical acquisition unit and the laser scanning system.

FIG. 20 provides an example of the inspection system 1100, using a conveyor belt as the transport 150. The conveyer belt may be placed around rollers 1120 that move the conveyer belt as they turn in the direction shown by A. The rollers may be driven by a transport motor control 485. As shown, an optical acquisition unit 110 may be located at a first position along the transport 150, and the laser module 200, including the laser driver 210, laser sensor 250, and laser beam 140, is located further downstream on the inspection path. The object 160 being inspected is moved by the conveyer belt so that it passes under the optical acquisition unit 110, if present, and the laser module 200. Optionally, a belt tensioner 1140 may be provided beneath the moving conveyor belt to provide a solid surface for inspection, and to remove any vibrational motion in the conveyor belt. The reduced vibration motion lessens the noise in the obtained optical images and laser scans of the inspected objects. As shown in FIG. 20, the conveyer belt may be marked to allow for automated calibration of optical acquisition unit 110 or laser module 200. Beveled markings along one side or on both sides of the transport, such as tick marks 1110, are used for calibration and location identification on the transport. In addition to the tick marks, other markings may be included to assist in identification of the objects being inspected or the position of the objects along the transport. These references can include numbering, differently shaped ticks, or other identifying marks. As an example, a single reference tick on either side of the transport may be used. This tick mark will be elongated with relation to the other uniform ticks for easy identification. The system may perform a modulation transfer function (MTF) of the tick marks, and optical acquisition unit 110 can additionally be calibrated for sharpness, blooming, focus, and depth of field using the tick marks as a reference. Due to the uniformity of the tick marks, position, depth of field, and resolution can be calibrated for both optical acquisition unit 110 and laser module 200, along with identification of image and point cloud distortion due to non-perpendicularity of tools. From this data, distortion can be calculated and corrected for. The tick marks can also control for velocity flutter by identifying any changes in velocity not recorded by the transport motor control 465. This information can be used to correct the rephasing point cloud data 1811 by adding a phase shift.

Figure 21:
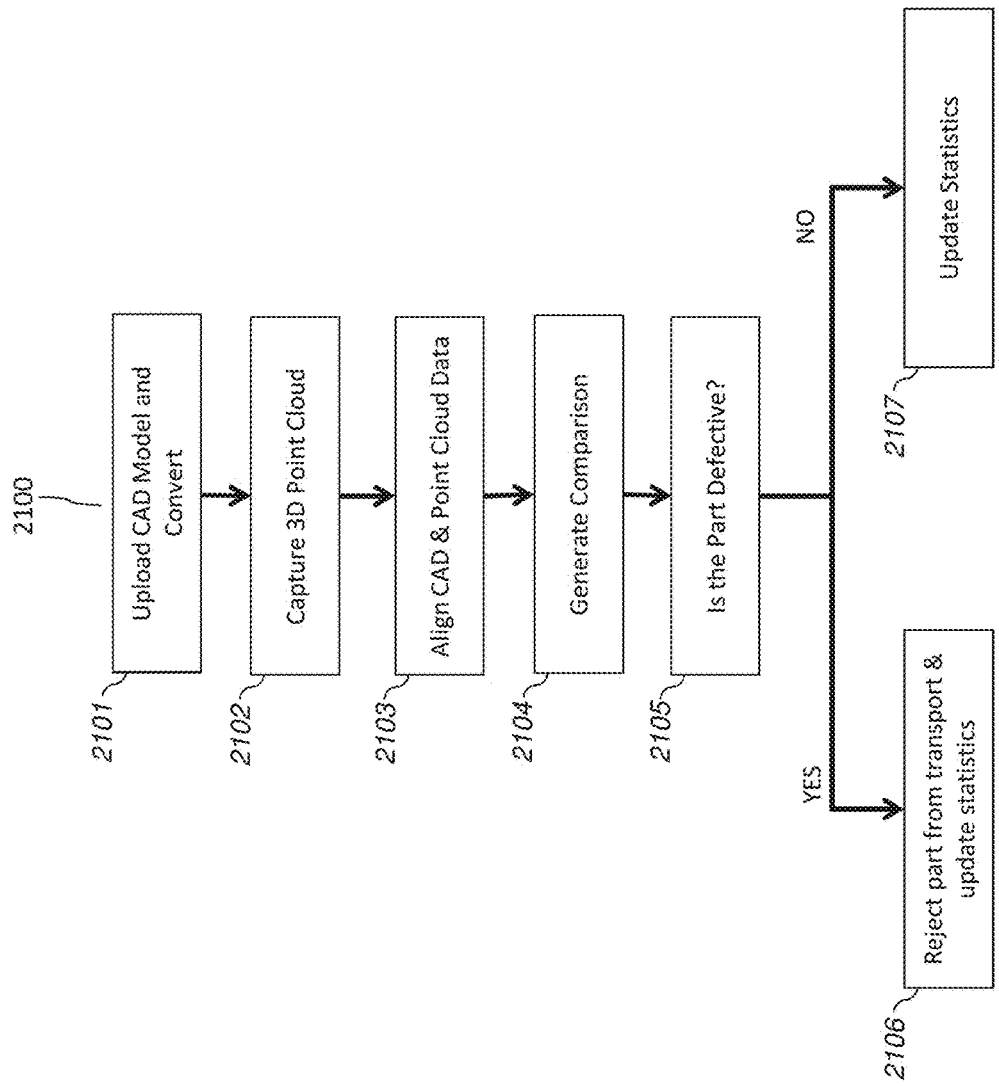
FIG. 21 depicts the processing of determining whether an object being inspected is defective.

FIG. 21 provides a flow diagram detailing an overview of the process 2100 to determine if an object being inspected is defective. As shown, a CAD model of the object is uploaded and converted at 2101, resulting in a CAD model mesh point cloud. As the object 160 moves down the transport 150 in the inspection system 100. If present, the object is imaged by an optical acquisition unit 110. The object passes under the laser acquisition modules 200 which perform laser scans. The laser scans result in the capture of a 3-D point cloud of the object at 2102. The 3-D point cloud of the object is aligned with the CAD model point cloud at step 2103, and a comparison between the two is then performed at 2104. Differences in points are determined, and a determination is made if the object 160 being inspected is defective at 1205. If the object 160 is defective, the object may be rejected from the transport and statistics regarding defective objects may be updated at 2106. If the object is not defective, then the statistics are updated to count another acceptable product passing the inspection process at 2107. Statistics may include environmental characteristics such as temperature and humidity as well as running tolerances against critical to function parameters. The statistical information can be related back the mold or the specific cavity based on the number formed on the object or other unique characteristics. This statistical information can be used to schedule preventative maintenance for both the machine and mold.

Figure 22:
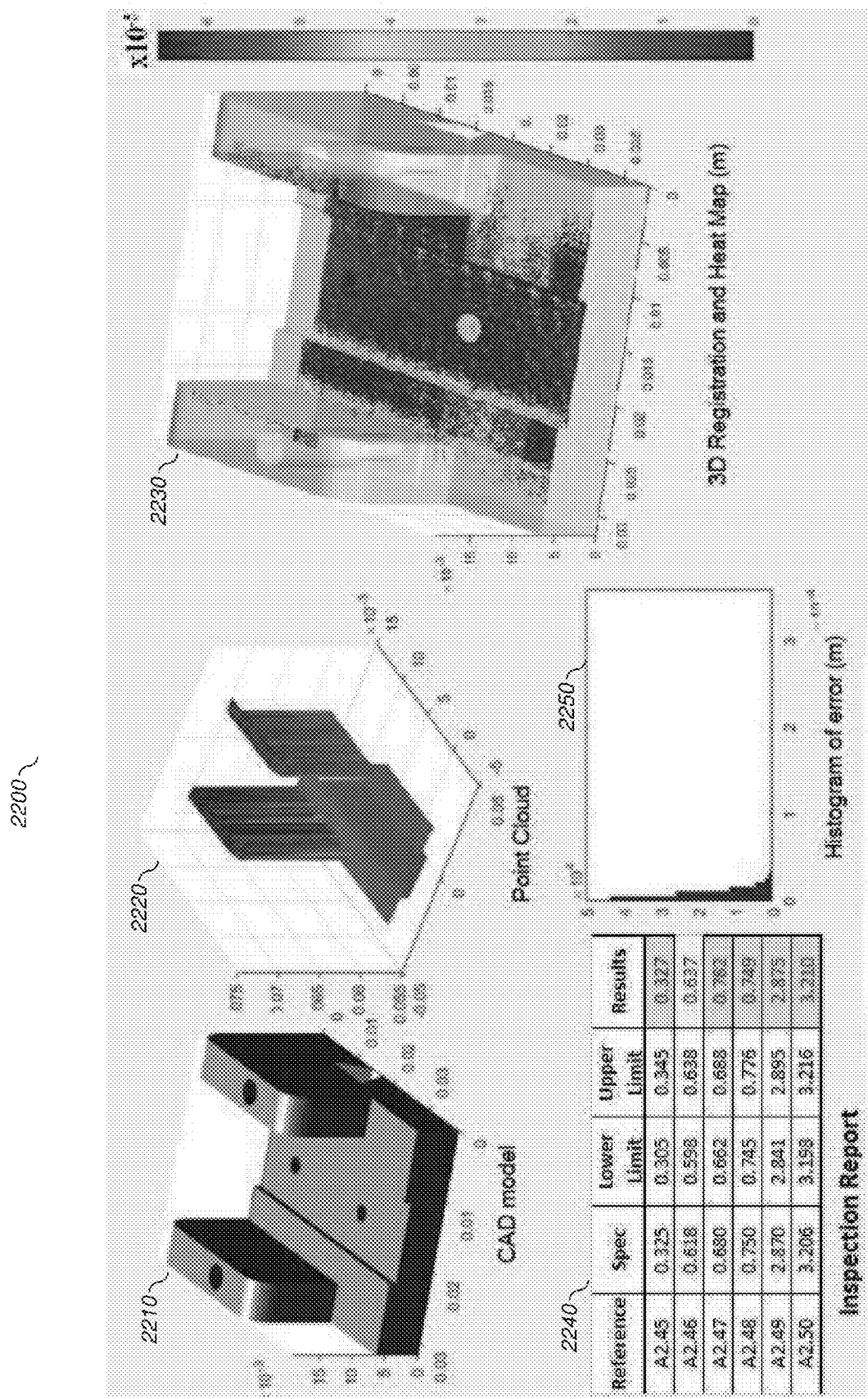
FIG. 22 depicts a sample user interface that may be displayed to the operator.

FIG. 22 provides a sample user interface that may be displayed to the operator at the end of the inspection process showing the inspection results. This user interface provided to the operator further includes the following functionality:

Import/Export
    Load point cloud data files into memory
    Load CAD model STL files into memory
    Export a point cloud to a PCL file
    Export a pre-processed CAD model to a proprietary "Part Inspection Profile" file Display/Visualization
    Display point clouds in a 3D view, with ability to rotate, translate, and zoom
    Display CAD models in a 3D view, with ability to rotate, translate, and zoom
    Display point clouds overlaid on a CAD model, with fit error annotation CAD model pre-processing
    Compute a list of rest position transforms
    Compute z-axis 2d projection images of CAD model in rest positions
    Interpolate surface points of CAD model Point Cloud manipulation
    Center a point cloud
    Rotate a point cloud to a new orientation
    Remove capture floor data points from a point cloud
    Perform capture artifact filtering of a point cloud
    Compute Z-axis projection images of the point cloud
    Find rest position of the object, based on projection image comparison w/CAD
    Perform 3D alignment of point cloud to CAD model, by
        Iterative closest FACE algorithm
        Iterative closest POINT algorithm Cloud to CAD comparison
    Compute error/deviation of aligned point cloud from CAD model
    Compute RMS, peak error over entire point cloud
    Compute RMS, peak error over specific surface of CAD model
    Compare surface error with inspection threshold
    Compute planar surface orientation angles, and compare with inspection tolerance
        Illustrate error with "heat" color and 'fuzz' line segments to CAD rendering As shown in FIG. 22, a user interface 2200 may be displayed to the operator on the operator display 128 or remotely through the network interface 445. The user interface 2200 may update real-time as the objects 160 are inspected or the operator may review the historical data for objects inspected or statistical trends. The user interface 2200 may organize the objects inspected to show only the objects exceeding or close to exceed tolerances so operator can focus on problem areas.

The user interface 2200 may include a display of the CAD model 2210, a point cloud 2220 from the laser model 200, as well as the histogram of error 2250 and 3D heat map of errors 2230. An operator can select the CAD model 2210 to open the CAD Model database 425 to display, add, or edit the CTF parameters as used by extract CTF parameters 1605. The point cloud 2220 may be the raw part point cloud 1810 or the registered point cloud 1814 as defined by the operator preferences. The operator may also define if data from one or multiple planes scans are displayed in the 3D heat map of errors 2230. An inspection report 2240 may also be displayed. The inspection report 2240 may include the critical to function parameters with ranges and the actual measured values. The results may be color coded to enable the operator to quickly identify measurements that exceed tolerances. For example, red may be used to indicate a measurement exceeded its tolerance while yellow may indicate near the tolerance. The user interface 2200 may also allow the operator to edit critical to function parameter limits thereby changing what is or is not acceptable. The inspection report 2240 may also include a drawing of the object with the measured dimensions for the object shown directly thereon. Overlaying the measured dimensions with the drawing displays the measured results in a format similar to the original drawing specification. The user interface 2200 may also include history trends for the critical to function parameters and statistical process control information across multiple batches or shifts. Using the trends and statistical process control, the mold wear over time can be identified and tracked. The data could be used to correlate changes in incoming material or process changes such as temperature or pressure. The operator can take the appropriate action to fix or replace molds that are producing objects that exceed tolerances. In cases where the mold has multiple cavities, the objects from specific cavities may be identified and tracked across multiple batches or shifts.

In injection molding, operators need the ability to qualify a new mold or evaluate the wear on existing molds. The baseline CAD model of the mold can be loaded and a color heat-map overlay of the errors for an object or a batch of objects can be overlaid with the mold to indicate where on the mold tolerances are being exceeded. This will characterize and track the mold from its initial installation to the time the mold needs to be repaired, reconditioned, or replaced. A display of the heat maps over time may be provided to the operator to show the operator the wear of the mold over time.

Each mold may contain one or more cavities that produce objects. In building a mold, each cavity will be produced based on a CAD model. In designing the mold, each cavity will have unique deviations from the CAD model. Each cavity can be characterized when the mold is made to produce a cavity CAD mesh unique to each cavity. Using the cavity number, or by using the cavity unique deviations, as the cavities signature, an operator is able to identify which cavity made the defective object. This will characterize and track each cavity from its initial installation to the time the cavity needs to be repaired. This could be displayed to show the operator the wear of each cavity over time.

Maintaining the Performance of a Scanning System

As noted above, the inspection process for an object requires several motion traversals between the object and scanning device to ensure that the entire region of interest of the object has been scanned. Components of the motion system, that moves both the scanning devices and the object itself, are subject to wear and performance degradation that can result in misregistration of the scanning data from each traversal with respect to the others. This degradation can invalidate carefully obtained calibration information intended to enable accurate and precise registration of scanning data from multiple traversals of an object. Algorithmic methods of registration exist that can compensate for some of this degradation, yet without intervention the degradation may persist or worsen. Further, analysis of this degradation can be useful in improving the compensation and prediction of system failure when adequate compensation is no longer possible.

As the inspection system is used, the mechanical assemblies used to move the profilometer or other scanning devices, as well as the platen or conveyor that advances the object being inspected, may cause noise in the measurements and misregistration. Moreover, the noise may change over time as the mechanical assemblies become worn, shift positions, and suffer performance degradation with use, and as connections between parts are altered from operation of the system. The introduction of noise and mis-registration requires continued calibration of the system to compensate for these conditions. In addition, due to the production environment, it is desirable to reduce the frequency and time required to calibrate the system so as not to affect the productivity of the manufacturing operation. Thus, a calibration process to monitor the overlap areas between subsequent traversals that project onto a known surface, such as the top of the surface that supports the part being inspected is used. This top surface that supports the object may be referred to as a "floor" of the inspection system. If misalignment is determined in the overlap area, the system either notifies the operator that a calibration is required or automatically calibrates the system and documents the event.

During scanning, as described with respect to FIG. 14 above, relative motion of the scanner and object are accomplished through translation of either or both the object and scanner. For example, as illustrated in FIG. 1A, a transport mechanism 150 such as a conveyor belt or platen may move the object along an inspection path, and the scanning device 200 may be moved relative to the object with a traversal mechanism 270, such as a leadscrew, and mounting assembly 260, as illustrated in FIG. 1A. The position of the scanner may be tracked by monitoring an encoder mounted on the traversal mechanism. The mounting assembly constrains the attitude of the scanner to ensure it points in a consistent direction. Complete scanning coverage of the region of interest of the object may be accomplished by moving the scanner back and forth traversing the object several times creating multiple traversal scans which contain regions of overlap, as illustrated in FIG. 14 and the description of FIG. 14 herein.

A key aspect of this configuration is that some of the translational elements may change velocity by altering direction or speed. Changes in direction, particularly reversals of direction, may manifest mechanical or electrical hysteresis in the position or attitude of either the object or the scanner. For example, as the scanner is moved by rotation of the leadscrew, mechanical hysteresis may exist due to tolerance limitations in the mounting assembly. This may lead to several effects when the leadscrew changes rotational direction or speed. Changes in rotational direction or speed may impart a different amount or direction of torque on the mounting assembly. Due to mechanical tolerance limits, this may introduce changes in the attitude of the scanner. Further, the mechanical hysteresis may introduce an offset in the scanner position indicated by the encoder. The unwanted changes in the attitude of the scanner and mechanical hysteresis may result in apparent spatial displacement of corresponding points within the overlap regions of the traversals. In other words, points recorded during different traversals may correspond to the same physical location on the object yet have different coordinate values. The difference between these points is referred to as a spatial displacement. This spatial displacement causes the points in the traversals to be misregistered.

Figure 23:
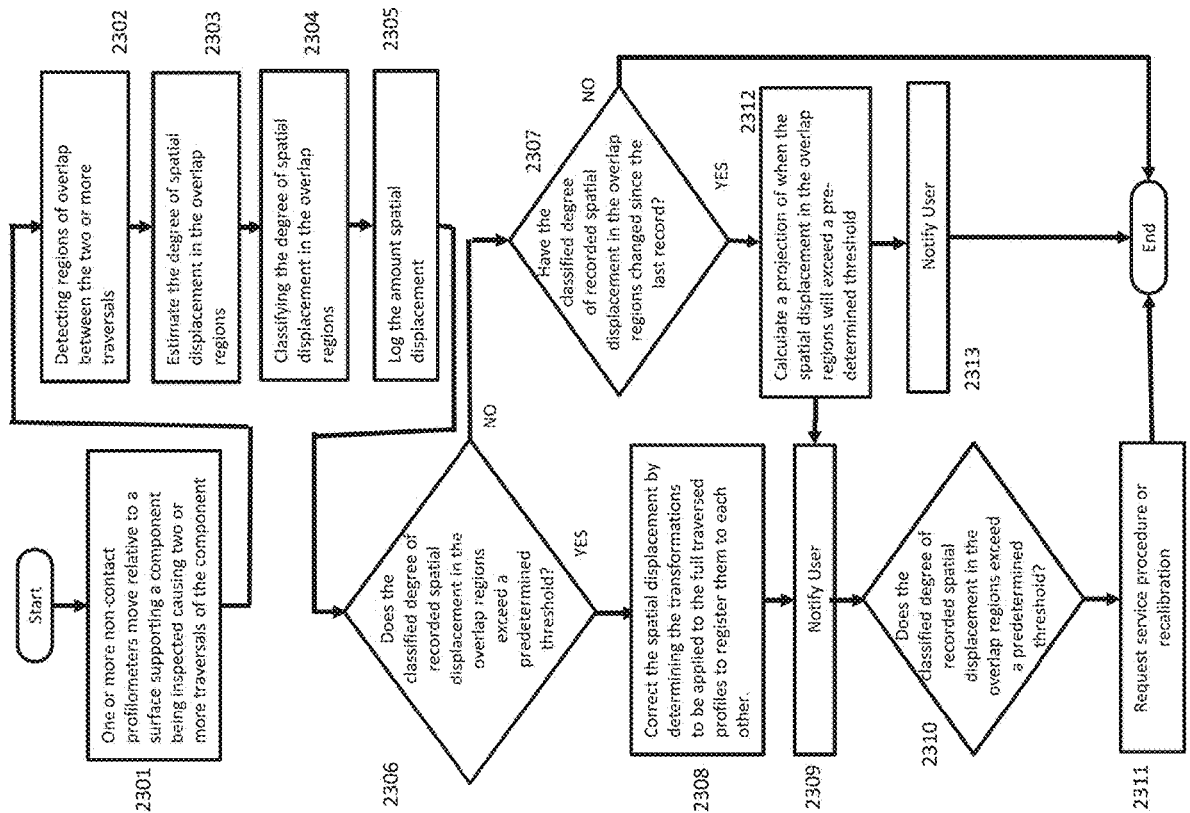
FIG. 23 depicts the process for monitoring performance of the scanning system, correcting spatial displacements, and notifying a user when the degree of spatial displacement exceeds a threshold.

The performance of the scanning system can be maintained by monitoring the changes in attitude or position of the scanner. FIG. 23 depicts the process for monitoring performance of the scanning system, correcting spatial displacements, and notifying a user when the degree of spatial displacement exceeds a threshold, thus allowing the user to request a service procedure or recalibration so that the scanning continues to perform accurate object scans. The process begins with the scanning of an object 2301, using scanners to traverse over the object two or more times such that there exists an overlap in the scanned regions. The region of overlap does not necessarily need to incorporate the object of the scan and may include only the surface on which the object rests, such as the top of the conveyor or platen.

The regions of overlap are detected 2302 and the overlapping regions are segmented from the traversals. The detection of regions of overlap may be accomplished by assuming that the positional accuracy of the one scan is sufficiently similar to that of previous scans. Detection and location of fiducial elements on the supporting surface may also aid in establishing regions of overlap.

The precise degree of displacement between the overlap regions is estimated and recorded 2303. The displacement may be estimated using well known algorithms such as Iterative Closest Point (ICP). The degree of displacement is classified 2304 and logged in a memory 2305. The classification may be based upon changes in velocity. For example, one classification may be defined to be when one of the mechanical assemblies used to move the profilometer or other scanning devices changes from one direction of travel to another. In this case, one class could occur when the direction of travel changes from left to right, and another class occurs when the direction of travel changes from right to left. If the classified degree of displacement exceeds a predetermined threshold 2306, a transformation matrix is created to correct the displacement and register the full traversal scans to each other thus creating a complete scan of the object 2308. If the classified degree of displacement does not exceed predetermined threshold 2306, the classified degree of displacement in the overlap regions is compared to the last record 2307. If there is a change in the spatial displacement, a projection will be calculated of when the spatial displacement in the overlap regions will exceed a pre-determined threshold 2312, and the user will be notified 2309 or 2313. The user may optionally be notified about the degree of displacement 2309. If the degree of displacement exceeds a predetermined threshold or cannot be corrected 2310, the user may be notified of a request for a service procedure to correct the cause of the displacement or a recalibration of the system 2311.

The history of displacements of a class may be tracked and analyzed 2313 to predict when the degree of displacement is likely to exceed a predetermined threshold 2310. The user may optionally be notified about the predicted failure 2313, thus allowing the user to take actions to recalibrate or perform a service procedure before the performance of the inspection system degrades to an unacceptable level.

General Summary of System and Process

A general summary of the system and process is described in the following. An operator using the inspection system first loads CAD models for the objects to inspect into the inspection system. The CAD models may already be included in a CAD model database, as explained above, or may be loaded by the operator into the CAD model database by the operator prior to beginning the inspection process. The objects to be inspected are then placed on the transport at a known position and in a predetermined orientation, either manually by an operator or automatically, and the transport motors control drives the transport so that objects are moved into the system at a known velocity.

Alternatively, the position and orientation may be determined by imaging the object with an optical acquisition unit. When an object moves into optical acquisition system, optical acquisition system captures at least one image of the object. The at least one image is sent to a system processing unit, such as described above with respect to FIG. 13. The system processing unit analyzes the images and determines an outline of the surface of the object. The system processing unit performs pattern matching techniques between the determined outline of the surface of the object and the CAD range images from the CAD model database. Based on the pattern matching results, a corresponding CAD model is selected from the database for comparison to the object being inspected. The system processing unit further uses the captured images to determine the position and orientation of the object on the transport.

A corresponding CAD model for the object being inspected is selected from the database for comparison to the object. When object moves along the transport within the laser field of view, the system processing unit instructs the laser module where to collect data along the transport. The laser module traverses perpendicularly to the transport direction, back and forth over a predefined area as objects are moved along the transport, such that the laser module field of view passes over the object one or more times. Reflected laser light is received at a laser sensor, and the received laser light is used to generate a 3-D point cloud of the scanned object. This raw part point cloud of the scanned object is sent to the system processing unit, which performs corrections to the point cloud based on the velocity at which the object was moving along the transport as well as the velocity and direction of the laser module as the scans were performed. As noted earlier, the corrections to the point cloud could also be performed by using the positional data. This corrected 3-D point cloud of the object is then prepared for analyzing.

The system processing unit retrieves the CAD point cloud for the object. The CAD point cloud is rotated so that it matches the determined coordinate geometry of the object. The corrected 3-D point cloud from the laser scans of the object is then interpolated to a predetermined geometric grid for comparison to the CAD model. Through subtractive reasoning, the interpolated corrected 3-D point cloud and CAD model are paired and a series of D values are calculated for, and associated with, each point in the point cloud. The D values are the subtractive difference between the relative positions of the CAD model corresponding to the inspected object and corrected 3-D point cloud data of the object 160. The D values may correspond to a set color, based on user preference. For example, a user may select red for D values outside a predetermined tolerance allowance, and green for values within the tolerance. The predetermined tolerance is based on how much deviation between the CAD model for the object and the point cloud of the scanned object is allowed. The CAD model with the color overlay will be generated and saved in a report, and a smoothing process may be applied so that the colors look uniform in the final overlay in the heat map. The smoothing of D value parameters can be performed by averaging or other means, in order to obtain a smooth gradation between color-coded segments of the visual representation of the point cloud data.

The visual representation of the point cloud data may be presented as a set of color-coded point cloud data points, a set of color-coded point cloud data points layered atop an image of registered CAD model, or a color-coded polygon mesh created by forming polygon surfaces between the point cloud data points. When presented as a color-coded polygon mesh, polygon surfaces are color-coded according to their assigned D value, being the average of D values for the points that the polygon surface connects.

If D values exceed a certain threshold as defined by CAD CTF parameters, the transport stops, or the object being inspected will be removed from the inspection line, and color overlaid heat map for that particular object may be shown on the operator control panel or saved to a failure report. Based on operator or customer specifications, if D values enter a certain threshold region, the system sends out an alert to notify operator. The alert may be an audible or visual alert presented at the operator control panel. Alerts may be color coded to impart urgency, based on user preferences. When the alerts are audible alerts, different tones, sounds, or volume may be used to signify the urgency. The alerts may also be a predefined or custom e-mail or text message sent over a network interface to predetermined recipients.

If D values do not exceed a certain threshold as defined by CAD CTF parameters, the transport and the object are allowed to continue. The color overlaid heat map for that particular object may be shown on the operator control panel or saved to an operator report.

The optical acquisition unit and laser module 200 inspect the plane or face of the object presented to the optical acquisition unit and/or laser module. However, the object may have CAD CTF parameters on the plane or face not presented to the optical acquisition unit and/or laser module. That is, one surface of the object will be contacting the transport, and thus will not be visible to the optical acquisition unit and/or laser module positioned above the transport. In order to image the bottom surface of the object that is in contact with the transport, and thus obtain a complete scan of all surfaces of the object, the system may include an additional laser module positioned under at least a top surface of the transport. The belt may be made of a transparent material, allowing the bottom laser module to scan the surface of the object through the transparent transport. In such a configuration, both the bottom and top laser modules would scan the object being inspected, capturing laser scans of all surfaces. The scans of the bottom surface are combined with the scans from the top laser module to form a combined point cloud representing all surfaces of the object. This combined point cloud is then compared to the CAD modules in the database, as described above. An additional optical acquisition unit may also be placed underneath the transport, to capture images of the surface in contact with the transport. Alternatively, the transport may comprise two separate belts, with a small gap in between. A laser module may be placed underneath the gap, with its field of view parallel to the length of the gap. As an object being inspected crosses over the gap from one transport belt to the other, the laser module positioned under the gap would capture scans of the bottom surface. Again, these scans of the bottom surface may be combined with the scans from the top laser modules to form a combined point cloud representing all surfaces of the object. As an alternative to using a transparent transport and positioning another laser module underneath the transport, the object being inspected may be flipped or rotated to expose a hidden plane of object as it moved along the transport. The object may be simply flipped or it may be automatically captured and rotated so that all planes of the object are presented to the optical acquisition unit and/or laser module for inspection.

In another embodiment, the objects to be inspected may be funneled to the optical acquisition unit which may identify the object to determine if the correct plane with the CAD CTF parameters was presented to optical acquisition unit. If the correct plane of object is presented, then it is allowed to continue along the transport. If the wrong side is presented, then the object is flipped over before be being inspected by the laser module. This has the advantages of getting all the objects in the same orientation and allows for a simpler flipping mechanism and reducing the area on the transport that needs to be scanned by the laser module.

In some cases when the CAD model for the object is not available, a golden object that is known to be within specification may be available. In this embodiment, the golden object would be scanned with the laser module to automatically generate and upload the CAD profiles for the object anticipated to be inspected, and where further updates may be perform in CAD model database. In this case, the operator would place the golden object on the transport and configure the system processing unit to store the CAD plane meshes and associated CAD point clouds, CAD range images into the CAD model database for future part recognition and lookup. The operator may add the required CAD CTF parameters to the CAD model database either through the operator control panel or network interface. In another embodiment, the inspection system may send an alert to the operator when it detects an object being scanned that it fails to identify in the part recognition and lookup process so that the operator could take the appropriate action.

In another embodiment, the golden object with known dimensions may be inspected to verify the calibration of the inspection system. In this example, the operator configures the inspection system for calibration and manually or automatically places the golden object on the transport to be scanned by the laser module. In addition, by using a golden object for calibration, the working distance, focus, magnification and similar image parameters for the laser module can be calibrated.

Polygonal scanners are commonly used in laser print engines, bar code scanners. Polygon scanners can be used for line-oriented scanning objects at fine resolutions. A spinning polygon mirror may be used to create a laser beam that performs high-speed linear scanning across the transport. The polygonal mirror may be rotated via a motor, and may be supported by a ball bearing or an air-bearing rotary spindle, to produce smooth rotation to minimize the distortions within laser beam. In addition, the laser sensor could be a linear array, CMOS, or similar technology known in the art.

The invention claimed is:

1. An object inspection system, the system comprising: a scanning unit configured to scan a calibration target to obtain a point cloud representing the target; and a processor configured to receive the point cloud representing the target from the scanning unit, and to: tessellate the point cloud into one or more tiles containing a plurality of points of the point cloud; for each of the one or more tiles, fit a plane model to the points contained in the tile, wherein the plane model includes value of a three-dimensional vector normal to the surface of the plane and the distance of the plane from a coordinate system reference point; add the normal vectors from each of the one or more tiles and calculate the average of the collection of normal vectors; use average normal vector orientation to define a reference plane outside the point cloud and calculate each cloud point to reference plane; and use a histogram to find local maximums, and create a group of points each with a distance to the defined reference plane that falls within a tolerance threshold to the local maximum; and monitor the performance of the scanning unit.

2. The system of claim 1 wherein the one or more tiles are non-overlapping.

3. The system of claim 1 wherein the processor is further configured to:
create the histogram of distances from points of the point cloud to the reference plane.

4. The object inspection system of claim 1, wherein the calibration target includes fiducial holes at known locations and positions, and wherein the processor is further configured to analyze the one or more plane models to detect the location and position of representations of these fiducial holes in the one or more plane models.

5. The object inspection system of claim 4, wherein the processor is further configured to determine a transformation matrix, based on the detected locations and positions of the representations of fiducial holes, that determines the orientation of the calibration target in three-dimensional space.

6. The system of claim 1 wherein the processor is further configured to:
compare each of the normal vectors to the calculated average and remove any of the normal vectors that are outliers.

7. The system of claim 6 wherein the comparing step is performed as a dot product of the average normal vector and the normal vector being compared.

8. The system of claim 6 wherein the processor is further configured to:
recalculate the average when any of the normal vectors are removed as outliers.

9. An object inspection system, the system comprising:
a scanning unit; and
a processor configured receive the captured point clouds from the scanning unit, and to:
determine a system calibration transform;
determine a recommended scan set-up parameters for an object to be scanned;
instruct the scanning unit to perform at least one scan of the object, wherein the at least one scan includes capturing two or more point clouds representing the same view of the scanned object and two or more point clouds representing different views of the scanned object;
receive the captured point clouds from the scanning unit;
determine a three-dimensional registration between the two or more point clouds representing the same view of the object;
determine a three-dimensional registration between the two or more point clouds representing different views of the object; and
monitor the performance of the scanning unit.

10. A method for calibrating an object inspection system comprising: scanning a calibration target to obtain a point cloud representing the target; tessellating the point cloud into one or more tiles containing a plurality of points of the point cloud; for each of the one or more tiles, fitting a plane model to the points contained in the tile, wherein the plane model includes value of a three-dimensional vector normal to the surface of the plane and the distance of the plane from a coordinate system reference point; adding the normal vectors from each of the one or more tiles and calculating the average of the collection of normal vectors; using average normal vector orientation to define a reference plane outside the point cloud and calculating each cloud point to reference plane; using a histogram to find local maximums, and creating a group of points each with a distance to the defined reference plane that falls within a tolerance threshold to the local maximum, wherein each of these groups is a planar segment of the point cloud corresponding to a detected plane of the target; for each planar segment, fitting a plane model, and calculating the normal value of the segmented points; calculating the average of the normal values weighted by the population of points in each planar segment; and applying the average normal vector to each of the planar segments, and recalculate the distance from the coordinate origin for each plane; and monitor the performance of the scanning.

11. The method of claim 10 wherein the one or more tiles are non-overlapping.

12. The method of claim 10 further comprising:
creating the histogram of distances from points of the point cloud to the reference plane.

13. The method of claim 10 further comprising:
comparing each of the normal vectors to the calculated average and removing any of the normal vectors that are outliers.

14. The method of claim 13 wherein the comparing step is performed as a dot product of the average normal vector and the normal vector being compared.

15. The method of claim 13 further comprising:
recalculating the average when any of the normal vectors are removed as outliers.

* * * * *